United States Patent
Chen et al.

(10) Patent No.: US 11,443,198 B1
(45) Date of Patent: Sep. 13, 2022

(54) DIRECTED ACYCLIC GRAPH MACHINE LEARNING SYSTEM

(71) Applicant: SAS Institute Inc., Cary, NC (US)

(72) Inventors: Xilong Chen, Chapel Hill, NC (US); Tao Huang, Chapel Hill, NC (US); Jan Chvosta, Raleigh, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 17/522,062

(22) Filed: Nov. 9, 2021

Related U.S. Application Data

(60) Provisional application No. 63/230,647, filed on Aug. 6, 2021, provisional application No. 63/223,409, filed on Jul. 19, 2021, provisional application No. 63/223,057, filed on Jul. 18, 2021.

(51) Int. Cl.
*G06N 5/02* (2006.01)
*G06F 17/16* (2006.01)

(52) U.S. Cl.
CPC .............. *G06N 5/022* (2013.01); *G06F 17/16* (2013.01)

(58) Field of Classification Search
CPC ...................................................... G06F 17/16
See application file for complete search history.

(56) References Cited

U.S. PATENT DOCUMENTS

2020/0327416 A1* 10/2020 Baker .................. G06N 3/0445
2020/0371835 A1* 11/2020 Chuang .................... G06N 3/04

OTHER PUBLICATIONS

Scanagatta, M., de Campos, C. P., Corani, G., & Zaffalon, M. (2015). Learning Bayesian Networks with Thousands of Variables. In NIPS, pp. 1864-1872.

Teyssier, M. and Koller, D. (2012) Ordering-based search: A simple and effective algorithm for learning bayesian networks. Proceedings of the Twenty-First Conference on Uncertainty in Artificial Intelligence (UAI2005).

Yu, Y., Gao, T., Yin, N., & Ji, Q. (2021). DAGs with No Curl: An Efficient DAG Structure Learning Approach. Proceedings of the 38th International Conference on Machine Learning.

Zheng, X., Aragam, B., Ravikumar, P., & Xing, E. P. (2018). DAGs with NO TEARS: Continuous optimization for structure learning (NeurIPS 2018, Spotlight).

(Continued)

*Primary Examiner* — Michael D. Yaary
(74) *Attorney, Agent, or Firm* — Bell & Manning, LLC

(57) ABSTRACT

A computing device learns a directed acyclic graph (DAG). An SSCP matrix is computed from variable values defined for observation vectors. A topological order vector is initialized that defines a topological order for the variables. A loss value is computed using the topological order vector and the SSCP matrix. (A) A neighbor determination method is selected. (B) A next topological order vector is determined relative to the initialized topological order vector using the neighbor determination method. (C) A loss value is computed using the next topological order vector and the SSCP matrix. (D) (B) and (C) are repeated until each topological order vector is determined in (B) based on the neighbor determination method. A best topological vector is determined from each next topological order vector based on having a minimum value for the computed loss value. An adjacency matrix is computed using the best topological vector and the SSCP matrix.

30 Claims, 7 Drawing Sheets

(56) References Cited

OTHER PUBLICATIONS

Zheng, X., Dan, C., Aragam, B., Ravikumar, P., & Xing, E. P. (2020). Learning sparse nonparametric DAGs (AISTATS 2020, to appear).
GitHub—fishmoon1234/DAG-NoCurl, from Proceedings of the 38$^{th}$ International Conference on Machine Learning, 2021.

* cited by examiner

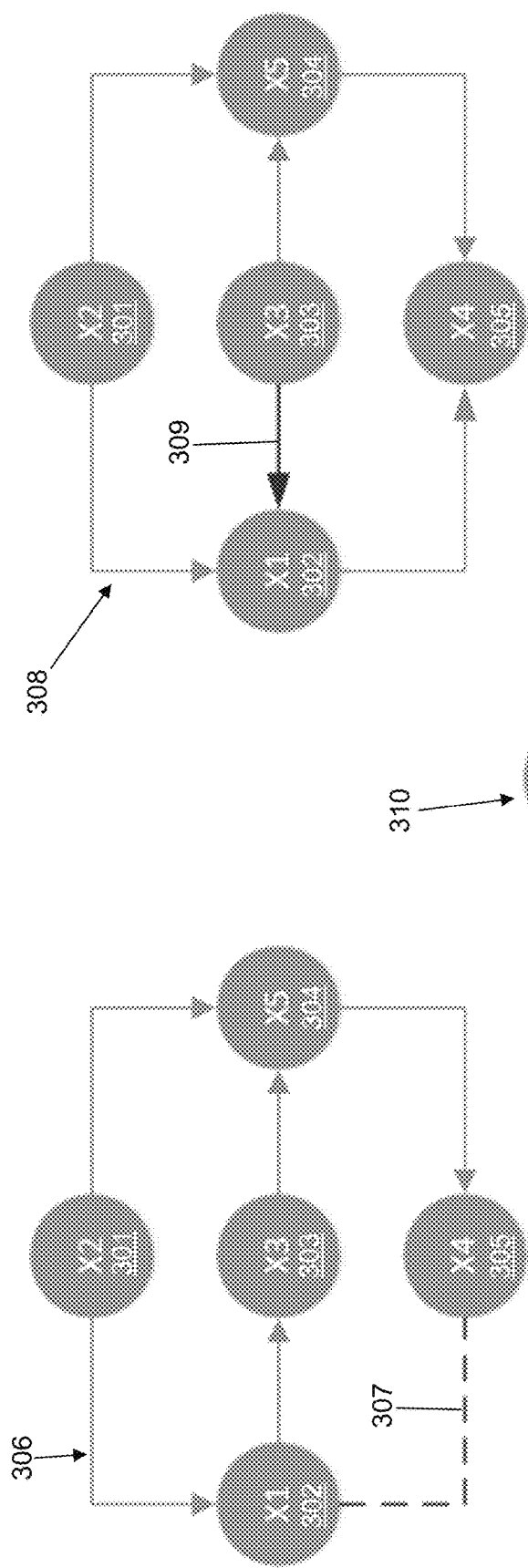
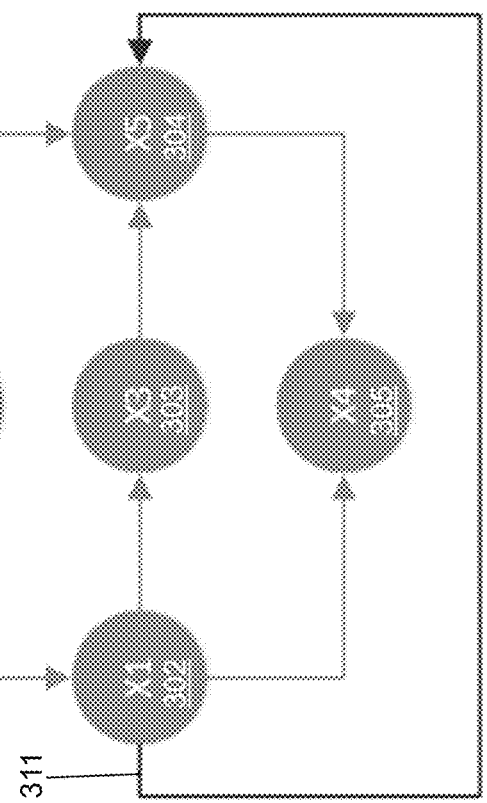
FIG. 3B
FIG. 3C
FIG. 3D

DIRECTED ACYCLIC GRAPH MACHINE LEARNING SYSTEM

CROSS-REFERENCE TO RELATED APPLICATIONS

The present application claims the benefit of and priority under 35 U.S.C. § 119(e) to U.S. Provisional Patent Application No. 63/223,057 filed on Jul. 18, 2021, and to U.S. Provisional Patent Application No. 63/223,409 filed on Jul. 19, 2021, and to U.S. Provisional Patent Application No. 63/230,647 filed on Aug. 6, 2021, the entire contents of which are hereby incorporated by reference.

BACKGROUND

In a directed acyclic graph (DAG), a vertex (or a node) can represent a variable. The edges and their directions can be expressed through an adjacency matrix W: if there is an edge from vertex i to vertex j, the element $w_{ij}=1$; otherwise, $w_{ij}=0$. The DAG is critical for causal inference, which has been widely applied in many fields, such as machine learning, artificial intelligence (AI), economics, finance, medicine, and so on. However, typically the structure of a DAG is provided by a subject matter expert because learning the DAG structure from a dataset is a well-known NP-hard problem given that the search space is combinatorial and scales super-exponentially with the number of variables. For example, for a dataset with 5 variables, there are 29,281 possible DAGs; for a dataset with 10 variables, there are 4.175E18 possible DAGs; and for a dataset with 20 variables, there are 2.345E72 possible DAGs, thus making the DAG learning process computationally difficult, if not computationally infeasible.

SUMMARY

In an example embodiment, a non-transitory computer-readable medium is provided having stored thereon computer-readable instructions that, when executed by a computing device, cause the computing device to learn a directed acyclic graph. A sum of square and cross products (SSCP) matrix is computed from variable values of a plurality of variables defined for a plurality of observation vectors. The SSCP matrix has a dimension of $N_v \times N_v$, where $N_v$ is a number of the plurality of variables. A topological order vector is initialized that defines a topological order for the plurality of variables. An initial loss value is computed using the initialized topological order vector and the computed SSCP matrix. (A) A neighbor determination method is selected. (B) A next topological order vector is determined relative to the initialized topological order vector using the selected neighbor determination method. (C) A loss value is computed using the determined next topological order vector and the computed SSCP matrix. (D) (B) and (C) are repeated until each topological order vector is determined in (B) based on the selected neighbor determination method. (E) A best topological vector is determined from each determined next topological order vector based on having a minimum value for the computed loss value. (F) An adjacency matrix is computed using the determined best topological vector and the computed SSCP matrix. The adjacency matrix has the dimension $N_v \times N_v$. Values in the computed adjacency matrix indicate whether a variable is a parent of another variable. (G) The computed adjacency matrix is output to define a directed acyclic graph based on the plurality of observation vectors.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to learn a directed acyclic graph.

In an example embodiment, a method of learning a directed acyclic graph is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3B depicts a learned DAG with a missing connection in accordance with an illustrative embodiment.

FIG. 3C depicts a learned DAG with a connection with a wrong direction in accordance with an illustrative embodiment.

FIG. 3D depicts a learned DAG with an extra connection in accordance with an illustrative embodiment.

FIGS. 4, 2B, and 2C depict a flow diagram illustrating examples of operations performed by a second DAG learning application of the DAG learning device of FIG. 1 in accordance with an illustrative embodiment.

DETAILED DESCRIPTION

Figure 3A:
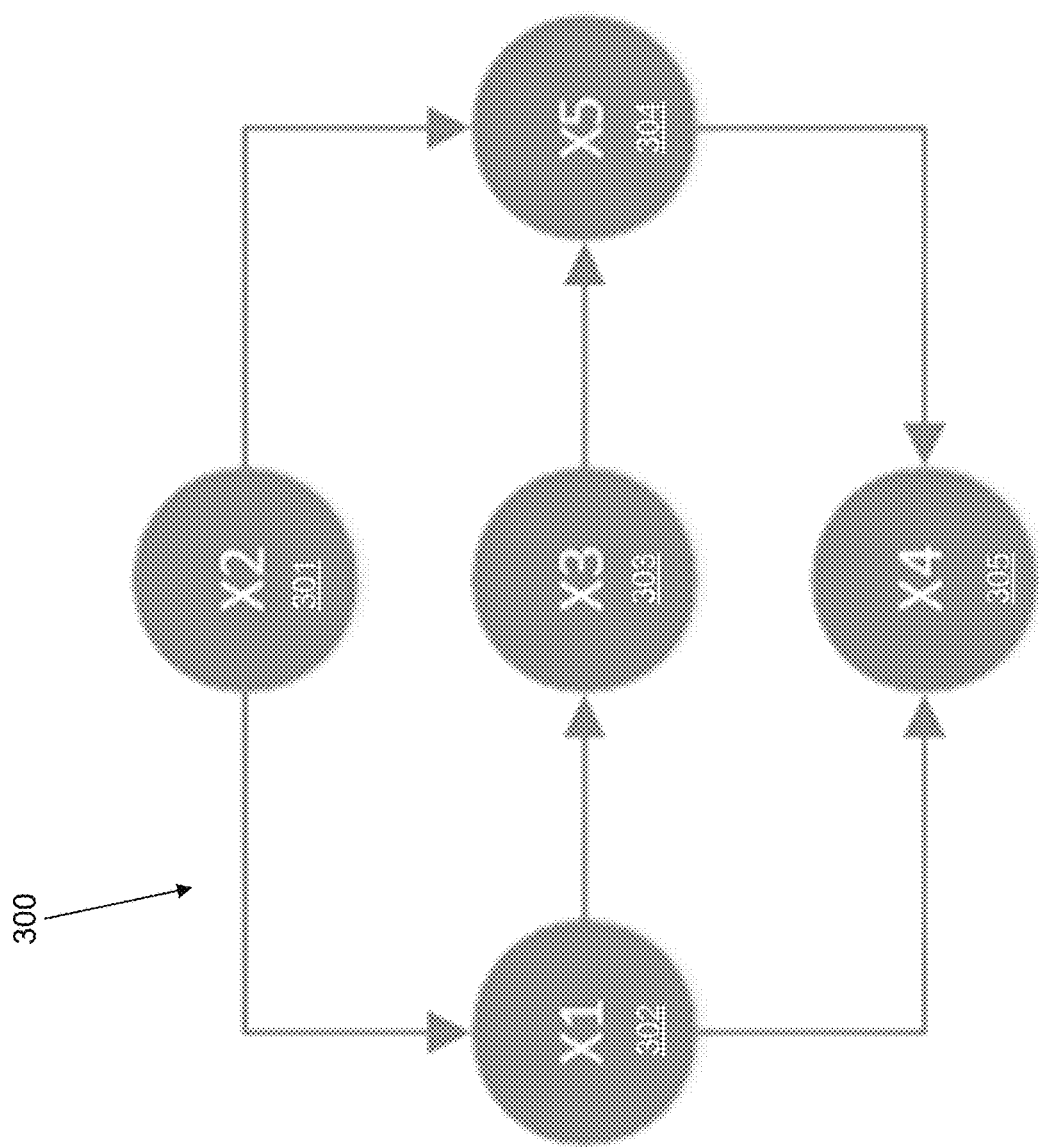
FIG. 3A depicts a DAG in accordance with an illustrative embodiment.

A graph consists of nodes (also known as vertices) and edges, and a directed acyclic graph (DAG) is a kind of graph such that (1) each edge has a direction from one node to another, and (2) there is no directed loop. A directed loop or cycle occurs when starting from one node and traveling along the directed edges, a starting node can be reached. Referring to FIG. 3A, a DAG 300 is shown in accordance with an illustrative embodiment. DAG 300 includes a first node 301 associated with a variable X2, a second node 302 associated with a variable X1, a third node 303 associated with a variable X3, a fourth node 304 associated with a variable X5, and a fifth node 305 associated with a variable X4.

When there is a directed edge from a node i to a node j, node i is a parent of node j, or equivalently, node j is a child of node i. Based on the directed edges of DAG 300, first node 301 is a parent of second node 302 and of third node 303; second node 302 is a parent of third node 303 and of fifth node 305; third node 303 is a parent of fourth node 304; and fourth node 304 is a parent of fifth node 305. Because a variable is associated with each node, variable X2 has no parent; variable X2 is a parent of variable X1 and of variable X5; variable X1 is a parent of variable X3 and of variable X4; variable X3 is a parent of variable X5; variable X5 is a parent of variable X4; and variable X4 has no children. All parents of a node construct a parent set of that node. Table 1 below summarizes the parent set for each variable included in DAG 300.

TABLE 1

| Variable | Parent set PA |
|---|---|
| X1 | {X2} |
| X2 | { } |
| X3 | {X1} |
| X4 | {X1, X5} |
| X5 | {X2, X3} |

A topological order r of a DAG defines an order of the nodes so that one node's parent set is a subset of the nodes whose orders are lower than the order of that node or $PA_i \subseteq \{X_j | r_j < r_i\}$, where $r_i$ is an $i^{th}$ topological order for node i. For example, a variable order {X2, X1, X3, X5, X4} for DAG 300 is equivalent to a topological order vector r=(2, 1,3,5,4).

DAG structure learning defines a graph structure where each node is associated with a variable in one-to-one fashion. The DAG structure learning is based on observation vectors included in input data 124 where each observation vector has observation values for each variable defined in input data 124. The DAG learning process estimates whether an edge exists between any two nodes (variables) and the direction of that edge if the edge exists based on constraints or scores or both.

Errors may result when a DAG is learned. For example, referring to FIG. 3B, a first learned DAG 306 has a missing connection 307 relative to DAG 300 in accordance with an illustrative embodiment. For example, referring to FIG. 3C, a second learned DAG 308 has a connection 309 that is in the wrong direction relative to DAG 300 in accordance with an illustrative embodiment. For example, referring to FIG. 3D, a third learned DAG 310 has an extra connection 311 relative to DAG 300 in accordance with an illustrative embodiment.

A DAG learning application 122 learns a DAG from input data 124 by searching for a best topological order associated with a minimum loss value. DAG learning application 122 provides a DAG learning process that more accurately learns a DAG. DAG learning application 122 can be applied in a distributed computing environment, for example, to support big data applications. DAG learning application 122 is computationally efficient resulting in a typically much faster computation time than using current methods when a number of observation vectors increases.

Figure 1:
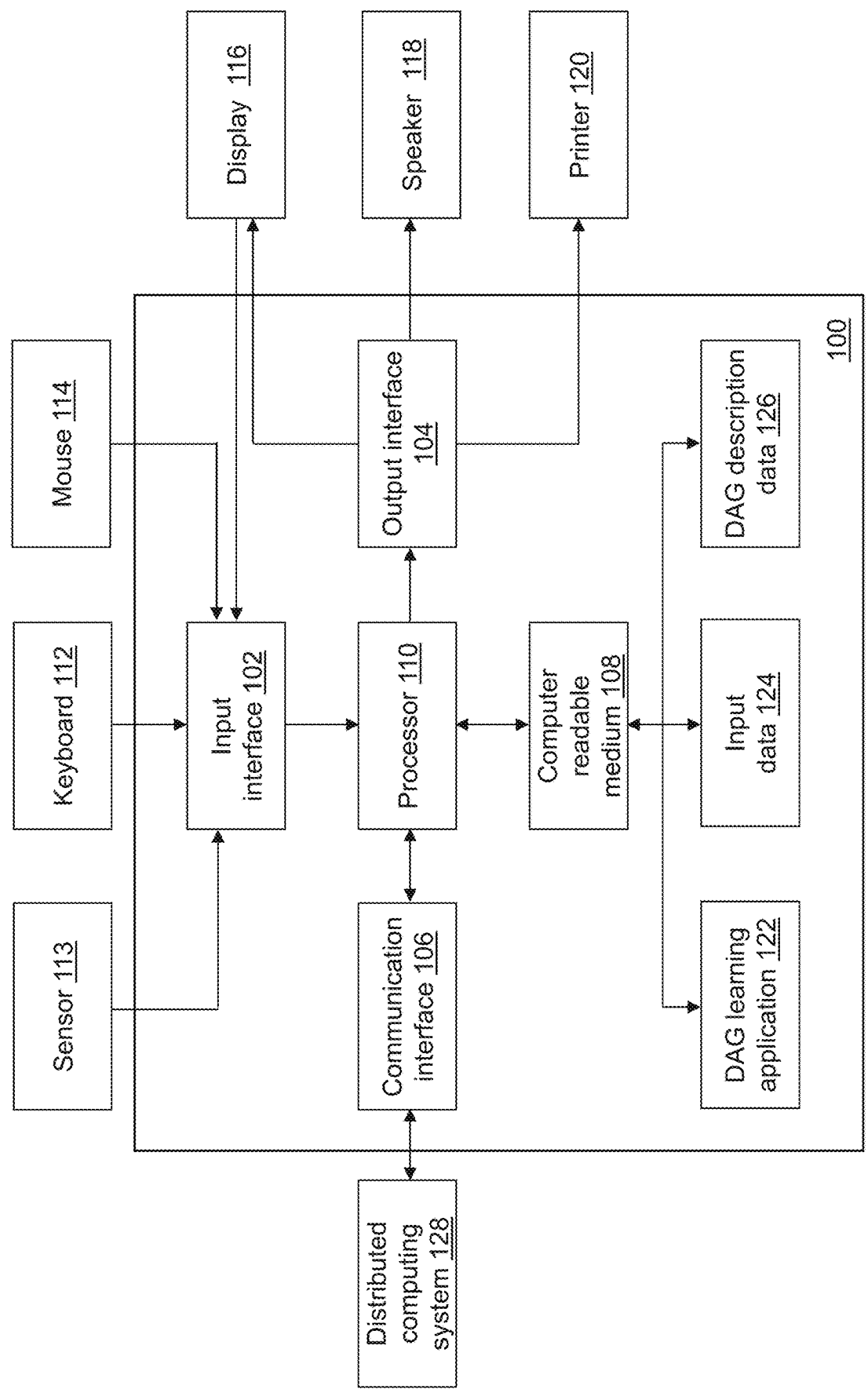
FIG. 1 depicts a block diagram of a DAG learning device in accordance with an illustrative embodiment.

Referring to FIG. 1, a block diagram of a DAG learning device 100 is shown in accordance with an illustrative embodiment. DAG learning device 100 may include an input interface 102, an output interface 104, a communication interface 106, a non-transitory computer-readable medium 108, a processor 110, DAG learning application 122, input data 124, and DAG description data 126. DAG learning application 122 learns a DAG from observations stored in input data 124. Fewer, different, and/or additional components may be incorporated into DAG learning device 100.

Input interface 102 provides an interface for receiving information from the user or another device for entry into DAG learning device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into DAG learning device 100 or to make selections presented in a user interface displayed on display 116.

The same interface may support both input interface 102 and output interface 104. For example, display 116 comprising a touch screen provides a mechanism for user input and for presentation of output to the user. DAG learning device 100 may have one or more input interfaces that use the same or a different input interface technology. The input interface technology further may be accessible by DAG learning device 100 through communication interface 106.

Output interface 104 provides an interface for outputting information for review by a user of DAG learning device 100 and/or for use by another application or device. For example, output interface 104 may interface with various output technologies including, but not limited to, display 116, a speaker 118, a printer 120, etc. DAG learning device 100 may have one or more output interfaces that use the same or a different output interface technology. The output interface technology further may be accessible by DAG learning device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. DAG learning device 100 may have one or more communication interfaces that use the same or a different communication interface technology. For example, DAG learning device 100 may support communication using an Ethernet port, a Bluetooth antenna, a telephone jack, a USB port, etc. Data and/or messages may be transferred between DAG learning device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. DAG learning device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. DAG learning device 100 also may have one or more drives that support the loading of a memory media such as a CD, DVD, an external hard drive, etc. One or more external hard drives further may be connected to DAG learning device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. DAG learning device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

DAG learning application 122 may perform operations associated with learning a DAG to describe parent-child relationships between variables in input data 124. Some or all of the operations described herein may be embodied in DAG learning application 122. The operations may be implemented using hardware, firmware, software, or any combination of these methods.

Referring to the example embodiment of FIG. 1, DAG learning application 122 is implemented in software (comprised of computer-readable and/or computer-executable instructions) stored in computer-readable medium 108 and accessible by processor 110 for execution of the instructions that embody the operations of DAG learning application 122. DAG learning application 122 may be written using one or more programming languages, assembly languages, scripting languages, etc. DAG learning application 122 may be integrated with other analytic tools. As an example, DAG learning application 122 may be part of an integrated data analytics software application and/or software architecture such as that offered by SAS Institute Inc. of Cary, N.C., USA. Merely for illustration, DAG learning application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS® Econometrics, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

DAG learning application 122 may be implemented as a Web application. For example, DAG learning application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input data 124 may include, for example, a plurality of rows and a plurality of columns. The plurality of rows may be referred to as observation vectors or records (observations), and the columns may be referred to as variables. In an alternative embodiment, input data 124 may be transposed. The plurality of variables defines a vector $x_i$ for each observation vector i=1, 2, . . . , N, where N is a number of the observation vectors included in input data 124. Each vector $x_i$ includes a value $x_{ij}$ for each variable j=1, . . . , $N_v$ to include in the DAG to be learned, where $N_v$ is a number of the plurality of variables included in input data 124 and used to learn the DAG.

Input data 124 may include additional variables that are not included in the plurality of variables. One or more variables of the plurality of variables may describe a characteristic of a physical object. For example, if input data 124 include data related to operation of a vehicle, the variables may include a type of vehicle, an oil pressure, a speed, a gear indicator, a gas tank level, a tire pressure for each tire, an engine temperature, a radiator level, etc.

Sensor 113 may measure a physical quantity in an environment to which sensor 113 is associated and generate a corresponding measurement datum that may be associated with a time that the measurement datum is generated. The measurement datum may be stored in input data 124. Illustrative sensors include a pressure sensor, a temperature sensor, a position or location sensor, a voltage sensor, a current sensor, a frequency sensor, a humidity sensor, a dewpoint sensor, etc. that may be mounted to various components used as part of a system.

Input data 124 may include data captured as a function of time for one or more physical objects. The data stored in input data 124 may be captured at different time points, periodically, intermittently, when an event occurs, etc. Input data 124 may include data captured at a high data rate such as 200 or more observation vectors per second for one or more physical objects. One or more columns of input data 124 may include a time and/or date value. Input data 124 may include data captured under normal and abnormal operating conditions of the physical object.

The data stored in input data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input data 124 may be generated as part of the Internet of Things (IoT), where things (e.g., machines, devices, phones, sensors) can be connected to networks and the data from these things collected and processed within the things and/or external to the things before being stored in input data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input data 124.

The data stored in input data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input data 124 may be stored on computer-readable medium 108 or on one or more computer-readable media of distributed computing system 128 and accessed by DAG learning device 100 using communication interface 106 and/or input interface 102. Input data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input data 124 may be stored using various data structures as known to those skilled in the art including one or more files of a file system, a relational database, one or more tables of a system of tables, a structured query language database, etc. on DAG learning device 100 or on distributed computing system 128.

DAG learning device 100 may coordinate access to input data 124 that is distributed across distributed computing system 128 that may include one or more computing devices. For example, input data 124 may be stored in a cube distributed across a grid of computers as understood by a person of skill in the art. As another example, input data 124 may be stored in a multi-node Hadoop® class. For instance, Apache™ Hadoop® is an open-source software framework for distributed computing supported by the Apache Software Foundation. As another example, input data 124 may be stored in a cloud of computers and accessed using cloud computing technologies, as understood by a person of skill in the art. The SAS® LASR™ Analytic Server may be used as an analytic platform to enable multiple users to concurrently access data stored in input data 124. The SAS Viya open, cloud-ready, in-memory architecture also may be used as an analytic platform to enable multiple users to concurrently access data stored in input data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
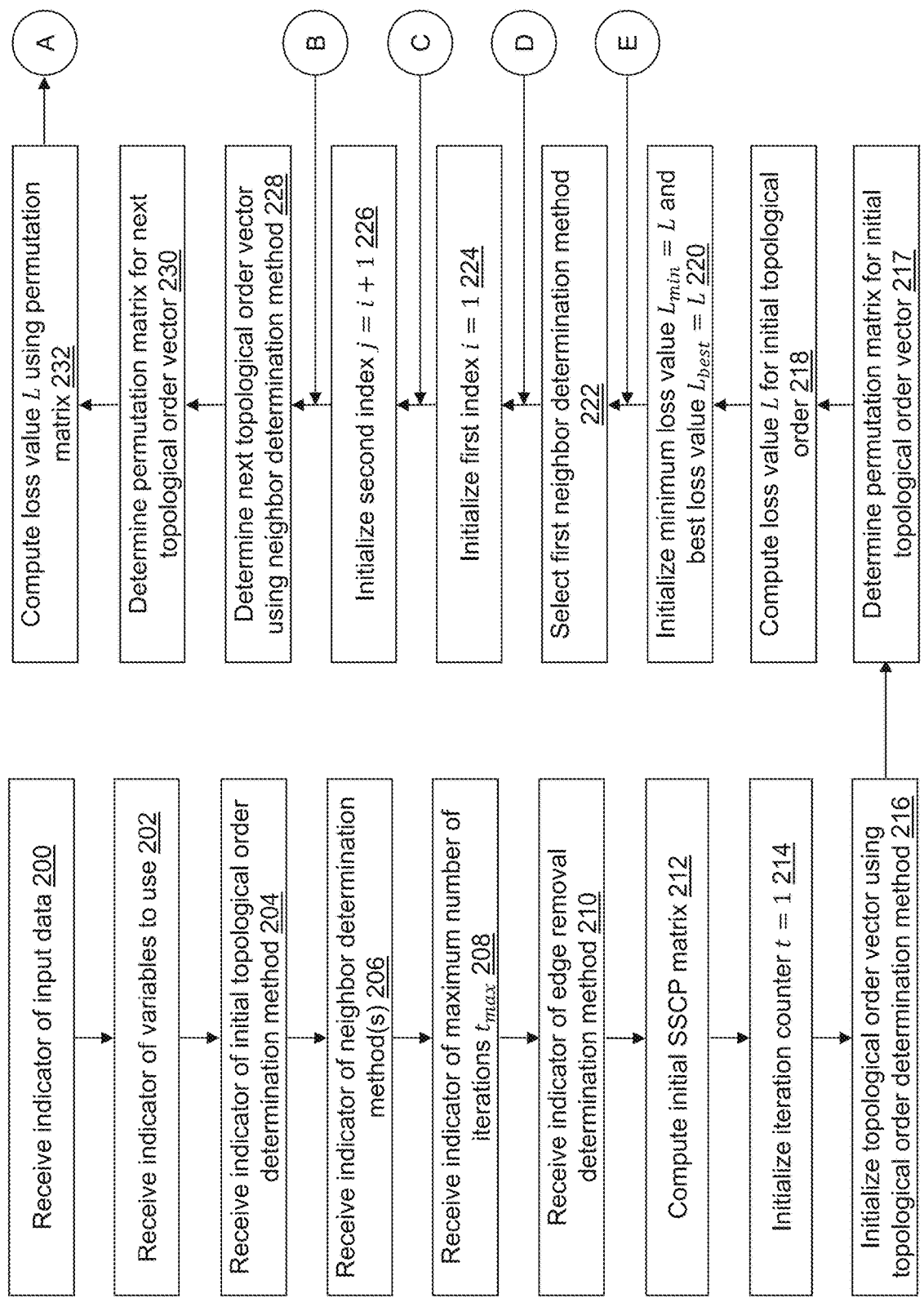
FIGS. 2A through 2C depict a flow diagram illustrating examples of operations performed by a first DAG learning application of the DAG learning device of FIG. 1 in accordance with an illustrative embodiment.
Figure 2B:
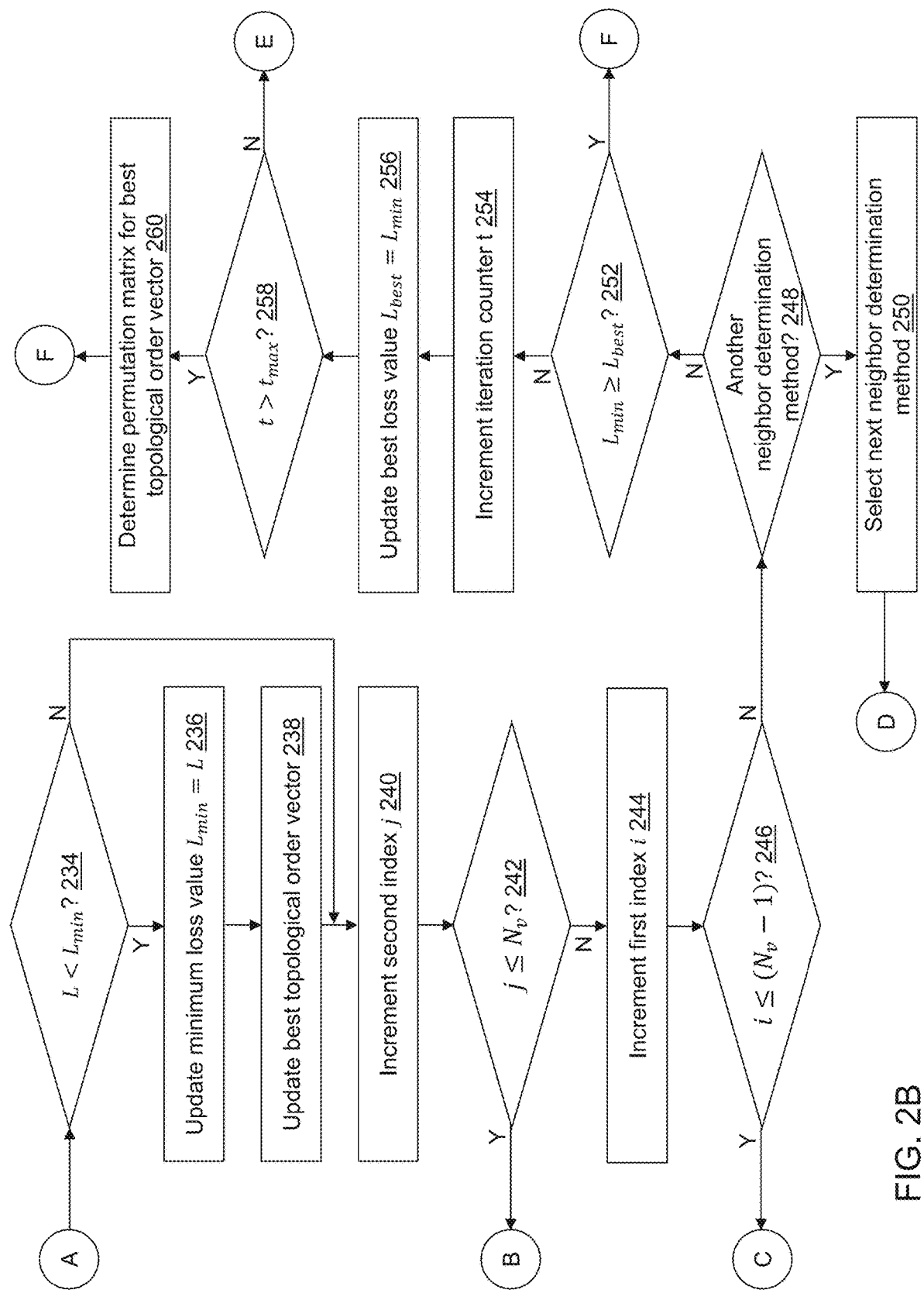
Figure 2C:
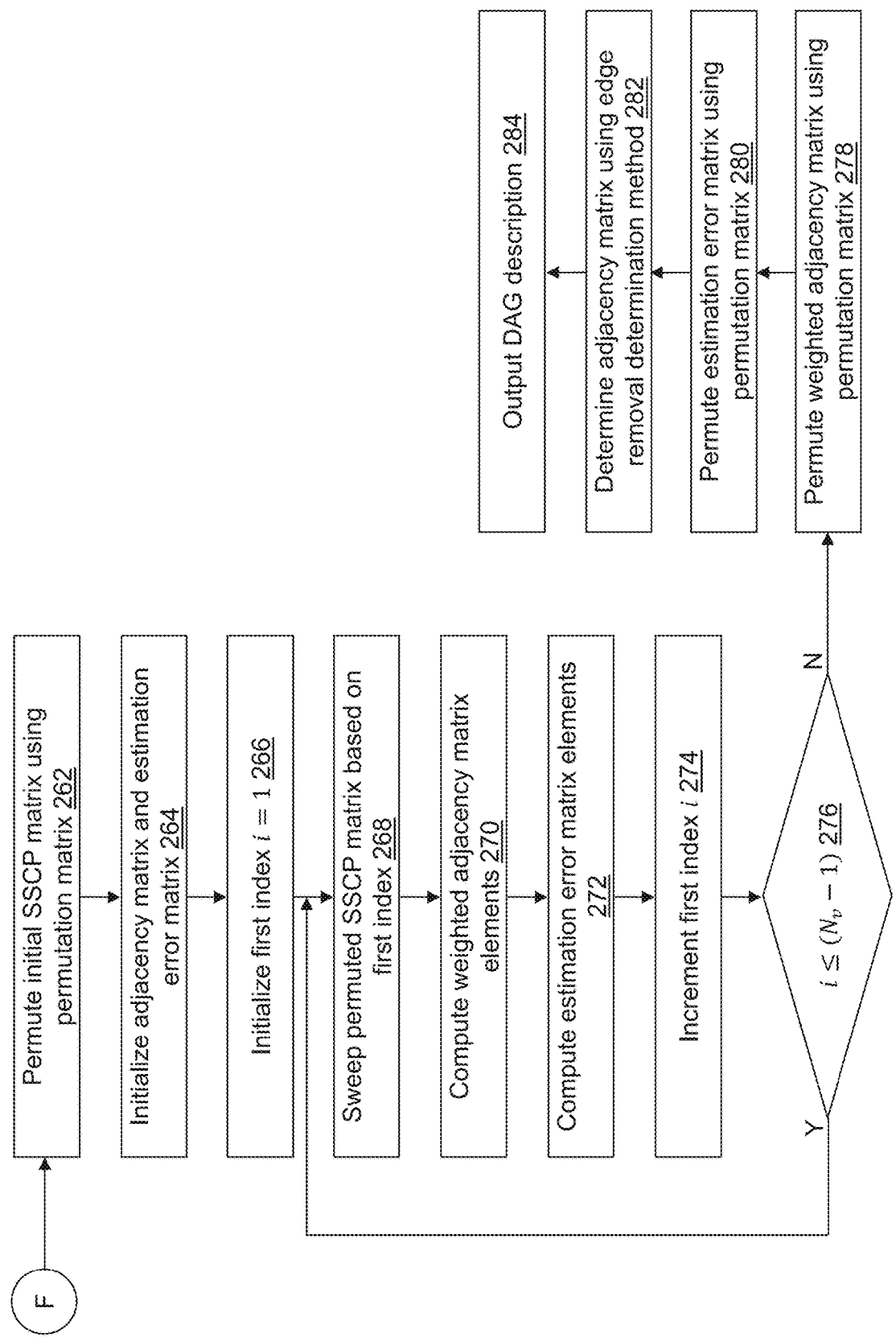

Referring to FIGS. 2A through 2C, example operations associated with DAG learning application 122 are described. Additional, fewer, or different operations may be performed depending on the embodiment of DAG learning application 122. For example, FIGS. 2A through 2C may describe a process that learns a linear DAG; whereas, FIGS. 4, 2B, and 2C describe a process that learns a non-linear DAG in accordance with an illustrative embodiment. In a linear DAG, a relationship between a variable and its parent variable is linear. Similarly, in a non-linear DAG, a relationship between a variable and its parent variable is non-linear. The order of presentation of the operations of FIGS. 2A through 2C and 4 is not intended to be limiting. Some of the operations may not be performed in some embodiments. Although some of the operational flows are presented in sequence, the various operations may be performed in various repetitions and/or in other orders than those that are illustrated. For example, a user may execute DAG learning application 122, which causes presentation of a first user interface window, which may include a plurality of menus and selectors such as drop-down menus, buttons, text boxes, hyperlinks, etc. associated with DAG learning application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by DAG learning application 122. Some of the operational flows further may be performed in parallel, for example, using a plurality of threads and/or a plurality of computing devices such as may be included in distributed computing system 128.

Referring to FIG. 2A, in an operation 200, a first indicator may be received that indicates input data 124. For example, the first indicator indicates a location and a name of input data 124. As an example, the first indicator may be received by DAG learning application 122 after selection from a user interface window or after entry by a user into a user interface window. In an alternative embodiment, input data 124 may not be selectable. For example, a most recently created dataset may be used automatically.

In an operation 202, a second indicator may be received that indicates the plurality of variables to use from input data 124. For example, the second indicator may indicate a plurality of column numbers or a plurality of column names. In an illustrative embodiment, all of the variables included in input data 124 may be included in the plurality of variables by default or without a user selection of the plurality of variables. Irrespective of the column number from which values for a specific variable are read, each variable of the plurality of variables may be sequentially assigned a unique index j from $j=1, \ldots, N_v$.

In an operation 204, a third indicator may be received that indicates an initial topological order determination method used to determine an initial topological vector r for the plurality of variables, where a topological order includes a list of the unique indexes assigned to the plurality of variables. As an example, the third indicator may be received by DAG learning application 122 after selection from a user interface window or after entry by a user into a user interface window. As a first example, the third indicator may indicate that the initial topological vector r is defined using the variable order defined by the sequentially assigned unique indices or $r=(1, 2, \ldots, N_v)$.

As a second example, the third indicator may indicate that the initial topological vector r is defined directly from the third indicator. For example, the third indicator may include r that is predefined and provided as an input. As a third example, the third indicator may indicate that the initial topological vector r is defined by randomly, successively selecting from remaining variables of the plurality of variables and adding them to r. As a fourth example, the third indicator may indicate that the initial topological vector r is defined based on an ascending variance value computed for each variable of the plurality of variables from input data 124.

As a fifth example, the third indicator may indicate that the initial topological vector r is defined based on an initial adjacency matrix $W_{initial}$. For example, the third indicator may include $W_{initial}$ that is predefined and provided as an input or the third indicator may include a method for computing $W_{initial}$. For illustration, the method for computing $W_{initial}$ may include a NO TEARS algorithm as described in a paper by Xun Zheng et al., *Dags with no tears: Continuous optimization for structure learning*, In Advances in Neural Information Processing Systems, pages 9472-9483, 2018 (NoTears algorithm) or a NoCurl algorithm as described in a paper by Yue Yu et al., *DAGs with No Curl: An Efficient DAG Structure Learning Approach*, Proceedings of the 38th International Conference on Machine Learning Jun. 14, 2021 (NoCurl algorithm). Any hyperparameters used by the method for computing $W_{initial}$ may further be provided using the third indicator.

As a sixth example, the third indicator may indicate that the initial topological vector r is defined based on a vector p̃. For example, the third indicator may include p̃ that is predefined and provided as an input or a method for computing p̃. For illustration, the method for computing p̃ may include the NoCurl algorithm. Any hyperparameters used by the method for computing p̃ may further be provided using the third indicator.

A default initial topological order determination method may further be stored, for example, in computer-readable medium 108 and used automatically without a user selection using the third indicator. For example, a default initial topological order determination method may be the variable order. Of course, the initial topological order determination method may be labeled or selected in a variety of different manners by the user as understood by a person of skill in the art. In an illustrative embodiment, the variable order may be used by default or without allowing a user selection using the third indicator though another default method may be used as an alternative default method.

In an operation 206, a fourth indicator may be received that indicates one or more neighbor determination methods used to define additional topological order vectors for evaluation. For example, the fourth indicator may indicate one or more names of a type of neighbor determination method. As an example, a neighbor determination method may be selected from "Move-Up", "Move-Down", "Swap", etc. For example, the fourth indicator may include a comma separated list of one or more names of neighbor determination methods such as Move-Up, Move-Down, Swap or one or more indices that each represent a unique predefined method. For example, an index of one may indicate the Move-Up neighbor determination method, an index of two may indicate the Move-Down neighbor determination method, and an index of three may indicate the Swap neighbor determination method. A default one or more neighbor determination methods may further be stored, for example, in computer-readable medium 108 and used automatically without a user selection using the fourth indicator. For example, a default one or more neighbor determination methods may be define by the comma separate list "Move-Up, Move-Down, Swap". Of course, the neighbor determination methods may be labeled or selected in a variety of different manners by the user as understood by a person of skill in the art.

In an operation 208, a fifth indicator of a maximum number of iterations $t_{max}$ may be received. In an alternative embodiment, the fifth indicator may not be received. For example, a default value may be stored, for example, in computer-readable medium 108 and used automatically. In another alternative embodiment, the value of the maximum number of iterations $t_{max}$ may not be selectable. Instead, a fixed, predefined value may be used. For illustration, a default value of the maximum number of iterations $t_{max}$ may be $t_{max}=N_v*N_v$ though other values may be used.

In an operation 210, a sixth indicator may be received that indicates an edge removal determination method used to determine which edges, if any, can be removed from the DAG once it is determined. As an example, the sixth indicator may be received by DAG learning application 122 after selection from a user interface window or after entry by a user into a user interface window. As a first example, the sixth indicator may indicate that edges are removed based on a comparison between a computed weighted adjacency matrix value and a predefined threshold value T, where each edge between a pair of variables may be removed when the weighted adjacency matrix value for the edge between the respective pair of variables is below the predefined threshold value T. As a second example, the sixth indicator may indicate that edges are removed based on a computed estimation error value and the predefined threshold value T, where the predefined threshold value may be indicated using the sixth indicator. Each edge between a pair of variables may be removed when the estimation error value for the edge between the respective pair of variables is above the predefined threshold value. A default edge removal determination method may further be stored, for example, in computer-readable medium 108 and used automatically without a user selection using the sixth indicator. For example, the default edge removal determination method may be based on the computed estimation error value with a default value for the predefined threshold value stored, for example, in computer-readable medium 108 and used automatically without a user selection using the sixth indicator. As another alternative, the default edge removal determination method may be based on the computed estimation error value with the predefined threshold value defined using the sixth indicator. Alternative edge removal determination methods that may be indicated using the sixth indicator are described for the SELECTION statement of the REGSELECT procedure on pages 391-392 of SAS® Visual Data Mining and Machine Learning 8.1 Statistical Procedures published by SAS Institute Inc. 2016.

In an operation 212, a sum of squares and cross products (SSCP) matrix is computed from values defined for each observation vector for each variable of the plurality of variables using $SSCP=X^\tau X$, where X is an input matrix having dimension $N \times N_v$ and defined based on $X=x_{i,j}$, $j=1,\ldots,N_v$; $i=1,\ldots,N$, where the $x_{i,j}$ are defined from input data 124, $\tau$ indicates a transpose, and SSCP has dimension $N_v \times N_v$. Computation of the SSCP matrix may be performed in parallel using a plurality of threads and/or computing devices, for example, as described in U.S. Pat. No. 8,996,518 that issued Mar. 31, 2015, to SAS Institute Inc.

In an operation 214, an iteration counter t is initialized, for example, using t=1.

In an operation 216, an initial topological order vector $r_0$ is initialized using the topological order determination method indicated in operation 204. The initial topological order vector $r_0$ has $N_v$ elements. Each value of the initial topological order vector $r_0$ is one of the unique values assigned to a variable of the plurality of variables read from a column of input data 124. For example, a value of one indicates the variable read from the first column that defines the plurality of variables; a value of two indicates the variable read from the second column that defines the plurality of variables; and so on. A best topological order vector $r_b$ may be initialized as $r_b=r_0$, and a current iteration topological order vector $r_c$ may be initialized as $r_c=r_0$.

As a first example, when the third indicator indicates that the initial topological order vector $r_0$ is defined using the variable order, $r_0=(1, 2, \ldots, N_v)$. As a second example, when the third indicator indicates that the initial topological order vector $r_0$ is defined directly from the third indicator, $r_0=r$, where r is defined by the third indicator.

As a third example, when the third indicator indicates that the initial topological order vector $r_0$ is defined randomly by successively selecting from remaining variables of the plurality of variables and adding their associated unique index to $r_0$, $r_{01}=rand(1, 2, \ldots, N_v)$, $r_{02}$ is selected as a random draw from among the remaining $N_v$ variables excluding the variable selected for $r_{01}$, $r_{03}$ is selected as a random draw from among the remaining $N_v$ variables excluding the variables selected for $r_{01}$ and $r_{02}$, and so on.

As a fourth example, when the third indicator indicates that the initial topological order vector $r_0$ is defined based on an ascending variance value computed for each variable of the plurality of variables, a variance value is computed for each variable by computing a mean value $$\mu_j = \frac{1}{N}\sum_{i=1}^{N} x_{i,j},$$

and a variance value $$v_j = \frac{1}{N}\sum_{i=1}^{N}(x_{i,j} - \mu_j)^2.$$

The initial topological order vector $r_0$ is defined by adding the unique value associated with each variable to $r_0$ based on increasing values of the variance value $v_j$.

As a fifth example, when the third indicator indicates that the initial topological order vector $r_0$ is defined based on the initial adjacency matrix $W_{initial}$, the method for computing $W_{initial}$ is executed to define $W_{initial}$ from input data 124 unless the third indicator includes $W_{initial}$. The method for computing $W_{initial}$ may be executed to provide a starting point for DAG learning application 122 so that DAG learning application 122 can quickly learn the adjacency matrix W that provides a more accurate DAG in terms of the computed loss value. The initial topological order vector $r_0$ is defined by identifying the variables that have no parents from values of $W_{initial}$. For example, a $j^{th}$ variable has no parents when all of the adjacency matrix values for that variable are zero, $W_{initial}(i, j)=0$, $i=1, \ldots N_v$, indicating there is no edge connected to the $j^{th}$ variable. The unique value associated with variable(s) with no parents are successively added to an end of the initial topological order vector $r_0$ that is initialized as an empty vector, and the initial adjacency matrix $W_{initial}$ is updated to remove the variable(s) added to the initial topological order vector $r_0$ as possible parents for remaining variables thereby creating new variable(s) with no parents. For example, the row and column associated with the added variable may be deleted from the initial adjacency matrix $W_{initial}$, thereby removing them as parents of remaining variables. As another option, any variable already included in the initial topological order vector $r_0$ is skipped as a possible parent of another variable to identify remaining variables that no longer have a parent. The unique value associated with variable(s) with no parents in the updated, initial adjacency matrix $W_{initial}$ are successively added to the end of the initial topological order vector $r_0$, and the initial adjacency matrix $W_{initial}$ is again updated to remove the variable(s) with no parents. The process of identifying variable(s) with no parents is repeated until the unique value associated with all of the variables has been added to the end of the initial topological order vector $r_0$.

As a sixth example, when the third indicator indicates that the initial topological order vector $r_0$ is defined based on a vector $\tilde{p}$, the method for computing $\tilde{p}$ is executed to define $\tilde{p}$, from input data 124 unless the third indicator includes $\tilde{p}$. Vector $\tilde{p}$ has $N_v$ elements. The initial topological order vector $r_0$ is defined as $r_0=\text{rank}(\tilde{p})$.

In an operation 217, a permutation matrix $P(r_0)$ is determined for the initial topological order vector where $P(r_0)$ includes a one in a $j^{th}$ column of each row. $P(i, j)=1$, when $r_0(i)=j$, $i=1, \ldots, N_v$, $j=1, \ldots, N_v$; else $P(i, j)=0$. For example, given $N_v=6$ and $r_0=(1,4,2,6,5,3)$, $$P(r_0) = \begin{bmatrix} 1 & 0 & 0 & 0 & 0 & 0 \\ 0 & 0 & 0 & 1 & 0 & 0 \\ 0 & 1 & 0 & 0 & 0 & 0 \\ 0 & 0 & 0 & 0 & 0 & 1 \\ 0 & 0 & 0 & 0 & 1 & 0 \\ 0 & 0 & 1 & 0 & 0 & 0 \end{bmatrix}.$$

In an operation 218, a loss value L may be computed for the initial topological vector $r_0$ using the following logic:

$$SSCP^{r_0} = P^{\tau}(r_0) \cdot SSCP \cdot P(r_0)$$

L=0
For i=1, ..., $N_v$−1
$\quad$L+=SSCP$^{r_0}$(i, i)
$\quad$Sweep(SSCP$^{r_0}$, i)
endfor
L+=SSCP$^{r_0}$($N_v$, $N_v$)

Sweep(SSCP$^{r_0}$, i) sweeps SSCP$^{r_0}$ on a partition defined by SSCP$^{r_0}$(i, i). For illustration, a sweep operator is described on pages 64-65 of SAS/STAT® 14.3 User's Guide Introduction to Statistical Modeling with SAS/STAT Software published by SAS Institute Inc. in 2017. The SWEEP operator can be used so that the loss can be calculated in just one sweep from i=1, ..., $N_v$−1.

In an operation 220, a minimum loss value $L_{min}$ and a best loss value $L_{best}$ are initialized with the loss value L computed for the initial topological vector $r_0$, $L_{min}$=L and $L_{best}$=L. The minimum loss value $L_{min}$ is the minimum loss value computed each iteration, and the best loss value $L_{best}$ is the minimum loss value computed across all of the iterations.

In an operation 222, a first neighbor determination method of the one or more neighbor determination methods indicated in operation 206 is selected as the neighbor determination method. For example, a first neighbor determination method may be selected from the comma separated list of one or more names or one or more indices.

In an operation 224, a first index i is initialized, for example, using i=1.

In an operation 226, a second index j is initialized, for example, using j=i+1.

In an operation 228, a next topological order vector r is determined from the current iteration topological order vector $r_c$ using the selected neighbor determination method. For example, when the selected neighbor determination method is Move-Up, the following logic defines the next topological order vector r:

For k=1, ..., $N_v$
$\quad$if $r_c(k)<i$ or $r_c(k)>j$, $r(k)=r_c(k)$
$\quad$if $r_c(k)=i$, $r(k)=j$
$\quad$if $i \leq r_c(k) < j$, $r(k)=r_c(k)+1$
endfor For example, when i=2, j=5, and $r_c=(2,1,3,5,4)$, the next topological order vector using the Move-Up neighbor determination method is r=(3,1,4,2,5). For example, when the selected neighbor determination method is Move-Down, the following logic defines the next topological order vector r:

For k=1, ..., $N_v$
$\quad$if $r_c(k)<i$ or $r_c(k)>j$, $r(k)=r_c(k)$
$\quad$if $r_c(k)=i$, $r(k)=j$
$\quad$if $i < r_c(k) \leq j$, $r(k)=r_c(k)-1$
endfor For example, when i=2, j=5, and $r_c=(2,1,3,5,4)$, the next topological order vector using the Move-Down neighbor determination method is r=(5,1,2,4,3). For example, when the selected neighbor determination method is Swap, the following logic defines the next topological order vector r:

For k=1, ..., $N_v$
$\quad$if $r_c(k) \neq i$ and $r_c(k) \neq j$, $r(k)=r_c(k)$
$\quad$if $r_c(k)=i$, $r(k)=j$
$\quad$if $r_c(k)=j$, $r(k)=i$
endfor For example, when i=2, j=5, and $r_c=(2,1,3,5,4)$, the next topological order vector using the Swap neighbor determination method is r=(5,1,3,2,4).

Similar to operation 217, in an operation 230, a permutation matrix $P(r)$ is determined for the next topological order vector.

Similar to operation 218, in an operation 232, a loss value L may be computed for the next topological vector r using the following logic and processing continues in operation 234 shown referring to FIG. 2B:

$SSCP^r = P^\tau(r) \cdot SSCP \cdot P(r)$
L=0
For i=1, . . . , $N_v-1$
L+=$SSCP^r(i, i)$
Sweep($SSCP^r$, i)
endfor
L+=$SSCP^r(N_v, N_v)$ Referring to FIG. 2B, in operation 234, a determination is made concerning whether $L<L_{min}$. When $L<L_{min}$, processing continues in an operation 236. When $L\geq L_{min}$, processing continues in an operation 240.

In operation 236, the minimum loss value $L_{min}$ is updated with the loss value L computed for the next topological vector r, $L_{min}=L$.

In an operation 238, the best topological order vector is updated $r_b=r$.

In operation 240, the second index j is incremented, for example, using j=j+1.

In an operation 242, a determination is made concerning whether $j\leq N_v$. When $j\leq N_v$, processing continues in operation 228 to determine a next topological order vector. When $j>N_v$, processing continues in an operation 244.

In operation 244, the first index i is incremented, for example, using i=i+1.

In an operation 246, a determination is made concerning whether $i\leq(N_v-1)$. When $i\leq(N_v-1)$, processing continues in operation 226 to determine a next topological order vector. When $i>(N_v-1)$, processing continues in an operation 248.

In an operation 248, a determination is made concerning whether there is another neighbor determination method indicated in operation 206 that has not been processed since a most recent iteration of operation 222. When there is another neighbor determination method to process, processing continues in an operation 250. When there is not another neighbor determination method to process, processing continues in an operation 252.

In operation 250, a next neighbor determination method of the one or more neighbor determination methods indicated in operation 206 is selected as the neighbor determination method, and processing continues in operation 224 to process the selected neighbor determination method. For example, a next neighbor determination method may be selected from the comma separated list of one or more names or one or more indices.

The processing of each neighbor determination method, operations 222 through 248 may be performed in parallel using a plurality of threads and/or computing devices. Through the indices i and j, each neighbor determination method systematically searches the neighborhood of topological order vectors thereby avoiding local minima. The systematic searching by each neighbor determination method may further be applied to discrete variables as described in a paper by Marc Teyssier and Daphne Koller, Ordering-Based Search: A Simple and Effective Algorithm for Learning Bayesian Networks, Proceedings of the Twenty-First Conference on Uncertainty in Artificial Intelligence (UAI 2005)(OBS algorithm) or in a paper by Mauro Scanagatta, et al., *Learning Bayesian Networks with Thousands of Variables*, Advances in Neural Information Processing Systems, volume 28, pp. 1864-1872 (2015).

In operation 252, a determination is made concerning whether $L_{min}\geq L_{best}$. When $L_{min}\geq L_{best}$, processing continues in an operation 262 shown referring to FIG. 2C. When $L_{min}<L_{best}$, processing continues in an operation 254. The loss value decreases as the number of iterations increases. When the minimum loss value $L_{min}$ of the current iteration t increases relative to the best loss value $L_{best}$ from the previous iterations, processing may be stopped. In an alternative embodiment, processing is not stopped. In another alternative embodiment, processing may continue by randomly selecting another topological order vector and continuing in operation 222.

In operation 254, the iteration counter t is incremented, for example, using t=t+1.

In an operation 256, the best loss value $L_{best}$ is updated with the minimum loss value $L_{min}$ computed from the last iteration, $L_{best}=L_{min}$.

In operation 258, a determination is made concerning whether $t>t_{max}$. When $t>t_{max}$, processing continues in an operation 260. When $t\leq t_{max}$, processing continues in operation 222 to process each of the neighbor determination methods for a next iteration.

Similar to operation 217, in operation 260, a permutation matrix $P(r_b)$ is determined for the best topological order vector and processing continues in operation 262 shown referring to FIG. 2C.

Referring to FIG. 2C, in operation 262, the SSCP is permuted based on the best topological order vector using $SSCP^{r_b}=P^\tau(r_b) \cdot SSCP \cdot P(r_b)$.

In an operation 264, a weighted adjacency matrix $\tilde{W}$ and an estimation error matrix $W^e$ are initialized with zeroes, where the weighted adjacency matrix $\tilde{W}$ and the estimation error matrix $W^e$ have dimension $N_v \times N_v$.

In an operation 266, the first index i is initialized, for example, using i=1.

In an operation 268, the $SSCP^{r_b}$ is updated by sweeping based on the first index i using $SSCP^{r_b}=\text{Sweep}(SSCP^{r_b}, i)$.

In an operation 270, the weighted adjacency matrix elements are computed, for example, using $\tilde{W}(j, i+1)=SSCP^{r_b}(j, i+1), j=1, \ldots i$.

In an operation 272, the estimation error matrix elements are computed, for example, using $W^e(j, i+1)=\sqrt{SSCP^{r_b}(i+1,i+1) * SSCP^{r_b}(j,j)/(N-i)}, j=1, \ldots i$.

In an operation 274, the first index i is incremented, for example, using i=i+1.

In an operation 276, a determination is made concerning whether $i\leq(N_v-1)$. When $i\leq(N_v-1)$, processing continues in operation 268. When $i>(N_v-1)$, processing continues in an operation 278.

In operation 278, the weighted adjacency matrix $\tilde{W}$ is permuted using $\tilde{W}=P(r_b) \cdot \tilde{W} \cdot P^\tau(r_b)$.

In an operation 280, the estimation error matrix $W^e$ is permuted using $W^e=P(r_b) \cdot W^e \cdot P^\tau(r_b)$.

In an operation 282, edges are trimmed from the weighted adjacency matrix $\tilde{W}$ using the edge removal determination method indicated in operation 210 to define an adjacency matrix W. As a first example, when the sixth indicator indicates that edges are removed based on a comparison between the weighted adjacency matrix $\tilde{W}$ and the predefined threshold value, $W(i, j)=0$, when $\tilde{W}(i, j)<T$, and $W(i, j)=1$, when $\tilde{W}(i, j)\leq T$, $i=1, \ldots, N_v$, $j=1, \ldots, N_v$.

As a second example, when the sixth indicator indicates that edges are removed based on a comparison between the estimation error matrix $W^e$ and the predefined threshold value, a matrix $W^p$ is computed from a t-statistic matrix $W^t$ that is computed from the estimation error matrix $W^e$ and the weighted adjacency matrix $\tilde{W}$, where $W^p$ and $W^t$ have dimension $N_v \times N_v$. The t-statistic matrix $W^t$ is initialized with zeroes, and the matrix $W^p$ is initialized with ones. When $W^e(i, j)>0$, $W^t(i, j)=\tilde{W}(i, j)/W^e(i, j), i=1, \ldots, N_v, j=1, \ldots, N_v$. When $W^t(i, j)>0$, $W^p(i, j)=2(1-\text{cdf}(\text{NORMAL}, W^t(i, j)))$, and when $W^t(i, j)<0$, $W^p(i, j)=2(\text{cdf}(\text{NORMAL}, W^t(i, j)))$, $i=1, \ldots, N_v, j=1, \ldots, N_v$, where cdf indicates a cumulative distribution function computation based on a normal distribution function NORMAL with the t-statistic matrix $W^t(i, j)$ value as the random variable. cdf(NORMAL, $W^t(i, j)$) returns a probability that an observation from the normal distribution is less than or equal to $W^t(i, j)$. $W(i, j)=0$, when $W^p(i, j)>T$, and $W(i, j)=1$, when $W^p(i, j)\leq T, i=1, \ldots, N_v, j=1, \ldots, N_v$.

An illustrative adjacency matrix W may be defined below.

| Variable | X1 | X2 | X3 | X4 | X5 | X6 | X7 |
|---|---|---|---|---|---|---|---|
| X1 | 0 | 1 | 0 | 0 | 0 | 0 | 0 |
| X2 | 0 | 0 | 0 | 1 | 1 | 0 | 0 |
| X3 | 0 | 1 | 0 | 1 | 0 | 1 | 0 |
| X4 | 0 | 0 | 0 | 0 | 0 | 1 | 0 |
| X5 | 0 | 0 | 0 | 0 | 0 | 0 | 0 |
| X6 | 0 | 0 | 0 | 0 | 1 | 0 | 1 |
| X7 | 0 | 0 | 0 | 0 | 0 | 0 | 0 |

The adjacency matrix W defines the DAG. Variable X1 and variable X3 have no parents. Variable X6 is the only parent of variable X7. Variables X1 and X3 are parents of variable X2. Variables X2 and X3 are parents of variable X4. Variables X2 and X6 are parents of variable X5. Variables X3 and X4 are parents of variable X6. Based on these relationships, a learned DAG 312 can be presented graphically.

In an operation 284, a description of the DAG is output. For example, the adjacency matrix W, the permuted weighted adjacency matrix $\tilde{W}$, the permuted estimation error matrix $W^e$, the matrix $W^p$, and/or the best topological order vector $r_b$ may be output to DAG description data 126. Additional, information may further be output.

The adjacency matrix can be computed directly from the weighted adjacency matrix $\tilde{W}$ or the permuted weighted adjacency matrix $\tilde{W}$ by in memory replacing each non-zero value with one. Additionally, a DAG can be created directly from the weighted adjacency matrix $\tilde{W}$ or the permuted weighted adjacency matrix $\tilde{W}$ by defining a parent variable for each non-zero entry in the weighted adjacency matrix $\tilde{W}$ or the permuted weighted adjacency matrix $\tilde{W}$. As a result, the term adjacency matrix can include a reference to the weighted adjacency matrix $\tilde{W}$ and/or the permuted weighted adjacency matrix $\tilde{W}$.

The only computation time cost that is a function of N is operation 212 that computes the initial SSCP matrix that is computed once at the beginning of the DAG learning process. The time cost of other computations performed by DAG learning application 122 is otherwise independent of N.

Figure 4:
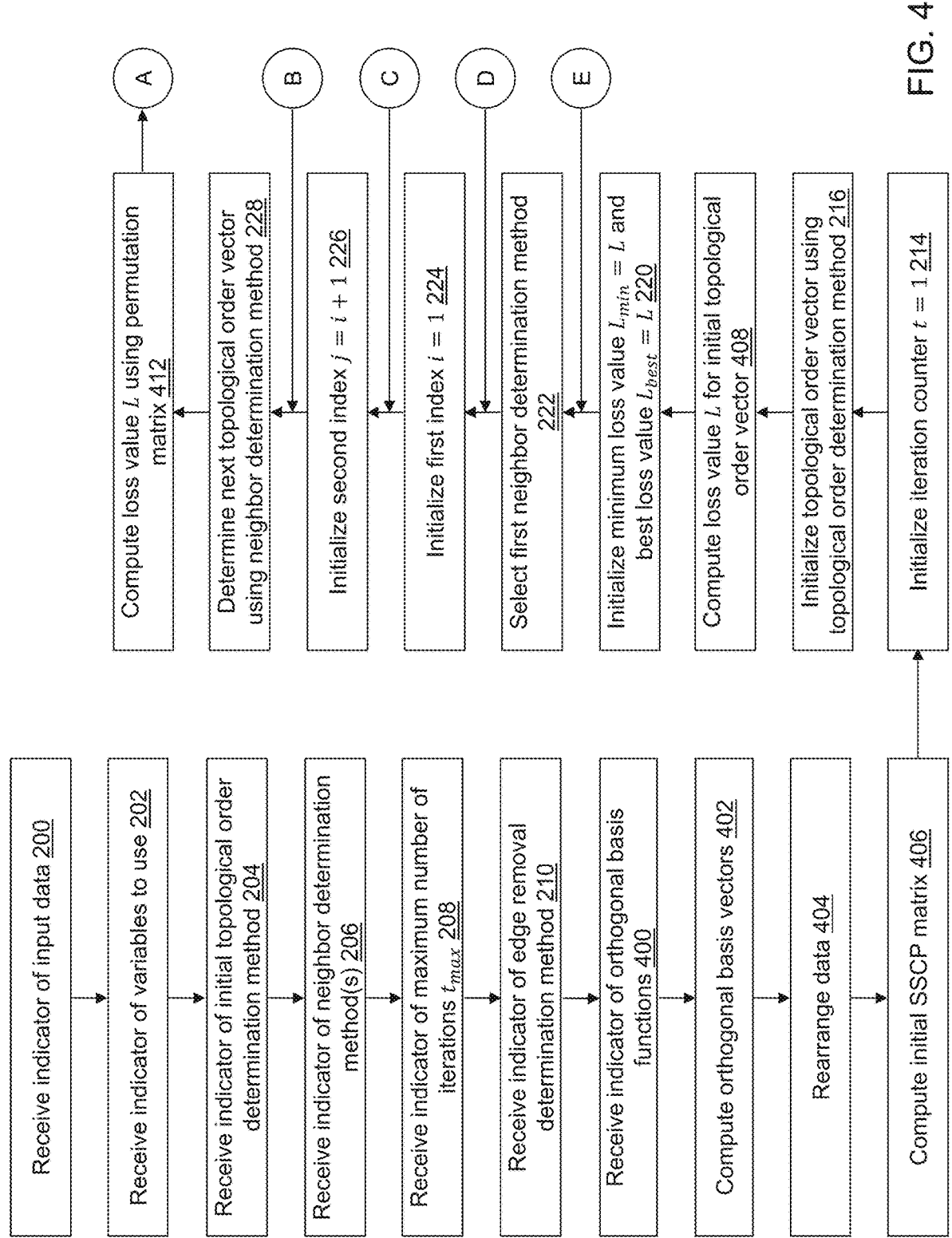

The operations of FIGS. 2A through 2C describe operations for learning a linear DAG in which the errors are assumed to be additive and the loss value computations are based on a sum of squared residuals. Referring to FIG. 4, example operations of DAG learning application 122 are described to learn a non-linear DAG. DAG learning application 122 to learn a non-linear DAG includes operations 200 through 210, 214, 216, 222 through 230, and operations 234 through 284 as shown in FIGS. 2B and 2C.

In an operation 400 that may be after operation 210, a seventh indicator may be received that indicates orthogonal basis functions $\varphi_k(.)$, k=1, . . . , K, where K is a number of orthogonal basis functions.

In an operation 402, the orthogonal basis functions $\varphi_k(.)$ are applied to input data 124 to define orthogonal basis vectors $z_k(i, j)=\varphi_k(x_{i,j})$, i=1, . . . N, j=1, . . . , $N_v$, k=1, . . . , K.

In an operation 404, data D is defined by rearranging such that D={$X_1, Z_1, \ldots, X_{N_v}, Z_{N_v}$}, where D has dimension N×(1+K)$N_v$, $X_j$={$x_{1,j}, \ldots, x_{N,j}$}, j=1, . . . , $N_v$, and $Z_j$={$Z_{1,j}, \ldots, Z_{k,j}$}, j=1, . . . , $N_v$ and $Z_{k,j}$={$z_k(1,j), \ldots, z_k(N,j)$}, k=1, . . . , K.

Instead of operation 212, in an operation 406, SSCP=$D^T D$, and processing may continue with operations 214 and 216.

Instead of operations 217 and 218, in an operation 408, a permutation matrix $P(r_0)$ is determined for the initial topological order vector, and a loss value L is computed for the initial topological vector $r_0$ by permuting SSCP in blocks where each block is (1+K)×(1+K). That is, the permutation matrix $P_{BLOCK}=P_{BLOCK}(r_0)$ has dimension (1+K)$N_v$×(1+K)$N_v$, and $P_{BLOCK}$((i−1)(1+K)+1: (1+K)i, (j−1)(1+K)+1:(1+K)j)=$0_{(1+K)\times(1+K)}$ if P(i, j)=0; otherwise, $P_{BLOCK}$((i−1)(1+K)+1:(1+K)i, (j−1)(1+K)+1:(1+K)j)=$I_{(1+K)\times(1+K)}$, i=1, . . . , $N_v$, j=1, . . . , $N_v$, where P=$P(r_0)$, $0_{(1+K)\times(1+K)}$ is a (1+K)×(1+K) matrix full of zeros, and $I_{(1+K)\times(1+K)}$ is a (1+K)×(1+K) identity matrix. The indices (i−1)(1+K)+1:(1+K)i, (j−1)(1+K)+1:(1+K)j select the (i, j)-th (1+K)×(1+K) block of $P_{BLOCK}$, the rows from (i−1)(1+K)+1 to (1+K)i and the columns from (j−1)(1+K)+1 to (1+K)j. Permuting SSCP means $SSCP^{r_0}=P_{BLOCK}(r_0)\cdot SSCP\cdot P_{BLOCK}^T(r_0)$.

The loss value L is computed using the following logic:
L=0
For i=1, . . . , $N_v$−1

$L+=SSCP^{r_0}((i-1)*(K+1)+1,(i-1)*(K+1)+1)$

For j=(i−1)*(K+1)+2, . . . , (i−1)*(K+1)+(K+1)
  Sweep($SSCP^{r_0}$,j)
endfor
endfor $L+=SSCP^{r_0}((N_v-1)*(K+1)+1,(N_v-1)*(K+1)+1)$ Processing may continue with operations 220 through 230. Instead of operations 230 and 232, in an operation 412, a permutation matrix P(r) is determined for the next topological vector r, and a loss value L is computed for the next topological vector r by again permuting SSCP in blocks. The loss value L is computed using the following logic:
L=0
For i=1, . . . , $N_v$−1

$L+=SSCP^r((i-1)*(K+1)+1,(i-1)*(K+1)+1)$

For j=(i−1)*(K+1)+2, . . . , (i−1)*(K+1)+(K+1)
  Sweep($SSCP^r$,j)
endfor
endfor $L+=SSCP^r((N_v-1)*(K+1)+1,(N_v-1)*(K+1)+1)$ Processing may continue with operations 234 through 284 of FIGS. 2B and 2C to learn the non-linear DAG.

A performance of DAG learning application 122 was evaluated in a first experiment using a linear synthetic dataset and was compared to existing algorithms with N=1000, $N_v$=100, and 600 edges. The results using the existing algorithms are shown in the last 10 rows of Table 8 of the paper by Yue Yu et al., *DAGs with No Curl: An Efficient DAG Structure Learning Approach*, Proceedings of the 38th International Conference on Machine Learning Jun. 14, 2021, and reproduced in Table 1 below where the last row of Table 1 includes the results using DAG learning application 122.

TABLE 1

| Method | Computation time (seconds) | SHD | Extra Edges | Missing Edges | Reverse Edges |
|---|---|---|---|---|---|
| NOTEARS | 2146.9 ± 31.22 | 116.52 ± 4.39 | 92.1 ± 3.66 | 20.54 ± 0.84 | 3.88 ± 0.21 |
| FGS | 105.57 ± 5.35 | 421.53 ± 15.01 | 356.15 ± 13.33 | 43.64 ± 1.59 | 21.74 ± 0.62 |

TABLE 1-continued

| Method | Computation time (seconds) | SHD | Extra Edges | Missing Edges | Reverse Edges |
|---|---|---|---|---|---|
| CAM | 290.21 ± 3.76 | 310.54 ± 4.54 | 156.83 ± 2.66 | 110.55 ± 2.03 | 43.16 ± 0.69 |
| MMPC | 14.10 ± 0.56 | 213.12 ± 1.49 | 12 ± 0.39 | 83 ± 1.84 | 118.12 ± 1.14 |
| Eq + BU | 13.15 ± 0.15 | 378.33 ± 8.5 | 365.13 ± 7.81 | 13.2 ± 1.2 | 0 ± 0 |
| Eq + TD | 11.37 ± 0.11 | 397.65 ± 8.66 | 383.96 ± 7.92 | 13.69 ± 1.2 | 0 ± 0 |
| NoCurl-1s | 43.98 ± 2.11 | 138.7 ± 2.61 | 97.83 ± 2.14 | 37.22 ± 0.69 | 3.65 ± 0.16 |
| NoCurl-2s | 106.88 ± 4.64 | 108.05 ± 2.74 | 78.33 ± 2.27 | 26.03 ± 0.6 | 3.69 ± 0.19 |
| NoCurl-1 | 41.29 ± 1.56 | 89.93 ± 3.49 | 74.34 ± 3.04 | 4.64 ± 0.34 | 10.95 ± 0.33 |
| NoCurl-2 | 84.24 ± 3.26 | 72.3 ± 3.8 | 60.12 ± 3.49 | 3.58 ± 0.3 | 8.6 ± 0.27 |
| 122 | 146.21 ± 27.64 | 20.98 ± 5.16 | 20.97 ± 5.17 | 0.01 ± 0.1 | 0 ± 0 |

SHD indicates the structural Hamming distance that is a sum of the number of extra edges included in the learned DAG, the number of missing edges included in the learned DAG, and the number of reversed edges included in the learned DAG. Each method was executed 100 times. The results include the mean±the standard error computed over the 100 trials. Using DAG learning application 122, the predefined threshold value T was defined as 1.0e-6, the initial topological order was determined randomly, and the neighbor determination methods were Move-Up, Move-Down, and Swap.

In each trial, the adjacency matrix of a DAG was randomly sampled following the Erdös-Rényi (ER) scheme. The weight value of each edge was uniformly sampled from $(-2,-0.5) \cup (0.5,2)$. The 1,000 observations were generated based on the weighted adjacency matrix and the additive noise from $N(0,1)$. DAG learning application 122 achieved a much lower SHD than any of the other methods.

Using DAG learning application 122, a performance was evaluated using different values for the predefined threshold value T and are shown in Table 2 below.

TABLE 2

| T | SHD | Missing Edges | Extra Edges | Reverse Edges |
|---|---|---|---|---|
| 0.000001 | 20.98 ± 5.16 | 20.97 ± 5.17 | 0.01 ± 0.1 | 0 ± 0 |
| 0.0001 | 8.69 ± 2.86 | 8.19 ± 2.87 | 0.50 ± 0.77 | 0 ± 0 |
| 0.01 | 48.17 ± 7.76 | 1.35 ± 1.24 | 46.82 ± 7.55 | 0 ± 0 |
| 0.1 | 448.89 ± 26.09 | 0.22 ± 0.46 | 448.67 ± 26.03 | 0 ± 0 |
| 0.999999 | 4349.99 ± 0.1 | 0 ± 0 | 4349.99 ± 0.1 | 0 ± 0 |

T=0.0001 provided the best performance.

A second dataset was generated with N=10,000, $N_v$=100, and 600 edges for a second experiment. For most algorithms, including NO TEARS and NoCurl algorithms, the computation time is linear relative to the number of observations; however, using DAG learning application 122, the computation time is almost independent of the number of observations. Using DAG learning application 122, a performance was evaluated using different values for the predefined threshold value T and are shown in Table 3 below.

TABLE 3

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0.44 ± 0.62 | 0 ± 0 | 0.44 ± 0.62 | 0 ± 0 |
| 0.01 | 46.13 ± 8.58 | 0 ± 0 | 46.13 ± 8.58 | 0 ± 0 |
| 0.1 | 449.02 ± 25.74 | 0 ± 0 | 449.02 ± 25.74 | 0 ± 0 |
| 0.999999 | 4350 ± 0 | 0 ± 0 | 4350 ± 0 | 0 ± 0 |

Using the predefined threshold value T=0.000001, the DAG was learned with no errors, and the computation time was 147.617±29.396, which is almost identical to the computation time using 1000 observation vectors.

Using DAG learning application 122, experiments were also performed for six cases with N=10,000: 1) 20-variable-80-edge case, 2) 40-variable-160-edge case, 3) 80-variable-320-edge case, 4) 20-variable-190-edge case, 5) 40-variable-780-edge case, and 6) 80-variable-3160-edge case. The datasets were generated by uniformly generating the adjacency matrix W from the range $(-1,-0.5) \cup (0.5,1)$. Results were generated using 100 trials with five different values for the predefined threshold value T, the initial topological order was determined randomly, and the neighbor determination methods were Move-Up, Move-Down, Swap.

A performance for case 1 is shown in Table 4 below.

TABLE 4

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0.01 ± 0.1 | 0 ± 0 | 0.01 ± 0.1 | 0 ± 0 |
| 0.01 | 1.05 ± 1.09 | 0 ± 0 | 1.05 ± 1.09 | 0 ± 0 |
| 0.1 | 10.56 ± 3.39 | 0 ± 0 | 10.56 ± 3.39 | 0 ± 0 |
| 0.999999 | 110 ± 0 | 0 ± 0 | 110 ± 0 | 0 ± 0 |

A performance for case 2 is shown in Table 5 below.

TABLE 5

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0.08 ± 0.31 | 0 ± 0 | 0.08 ± 0.31 | 0 ± 0 |
| 0.01 | 6.18 ± 3.25 | 0 ± 0 | 6.18 ± 3.25 | 0 ± 0 |
| 0.1 | 62.17 ± 9.78 | 0 ± 0 | 62.17 ± 9.78 | 0 ± 0 |
| 0.999999 | 620 ± 0 | 0 ± 0 | 620 ± 0 | 0 ± 0 |

A performance for case 3 is shown in Table 6 below.

TABLE 6

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0.38 ± 0.6 | 0 ± 0 | 0.38 ± 0.6 | 0 ± 0 |
| 0.01 | 30.17 ± 5.32 | 0 ± 0 | 30.17 ± 5.32 | 0 ± 0 |
| 0.1 | 289.95 ± 19.64 | 0 ± 0 | 289.95 ± 19.64 | 0 ± 0 |
| 0.999999 | 2840 ± 0 | 0 ± 0 | 2840 ± 0 | 0 ± 0 |

A performance for case 4 is shown in Table 7 below.

TABLE 7

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0 ± 0 | 0 ± 0 | 0 ± 0 | 0 ± 0 |
| 0.01 | 0 ± 0 | 0 ± 0 | 0 ± 0 | 0 ± 0 |
| 0.1 | 0 ± 0 | 0 ± 0 | 0 ± 0 | 0 ± 0 |
| 0.999999 | 0 ± 0 | 0 ± 0 | 0 ± 0 | 0 ± 0 |

A performance for case 5 is shown in Table 8 below.

TABLE 8

| T | SHD | Missing Edges | Extra Edges | Reverse Edges |
|---|---|---|---|---|
| 0.000001 | 0 ± 0 | 0 ± 0 | 0 ± 0 | 0 ± 0 |
| 0.0001 | 0 ± 0 | 0 ± 0 | 0 ± 0 | 0 ± 0 |
| 0.01 | 0 ± 0 | 0 ± 0 | 0 ± 0 | 0 ± 0 |
| 0.1 | 0 ± 0 | 0 ± 0 | 0 ± 0 | 0 ± 0 |
| 0.999999 | 0 ± 0 | 0 ± 0 | 0 ± 0 | 0 ± 0 |

A performance for case 6 is shown in Table 9 below.

TABLE 9

| T | SHD | Missing Edges | Extra Edges | Reverse Edges |
|---|---|---|---|---|
| 0.000001 | 0.51 ± 4.7 | 0.49 ± 4.5 | 0 ± 0 | 0.02 ± 0.2 |
| 0.0001 | 0.38 ± 3.8 | 0.36 ± 18.51 | 0 ± 0 | 0.02 ± 0.2 |
| 0.01 | 0.23 ± 2.3 | 0.21 ± 15.11 | 0 ± 0 | 0.02 ± 0.2 |
| 0.1 | 0.14 ± 1.4 | 0.12 ± 13.08 | 0 ± 0 | 0.02 ± 0.2 |
| 0.999999 | 0.02 ± 0.2 | 0 ± 0 | 0 ± 0 | 0.02 ± 0.2 |

For cases 1, 2, and 3, using the predefined threshold value T=1.0e-6 resulted in a learned DAG that is identical to the true DAG. A True Positive Rate (TPR) was always 100% meaning DAG learning application 122 always found all of the edges with the correct direction. For cases 4 and 5, the learned DAG was identical to the true DAG for all values of the predefined threshold value. For case 6, the learned DAG was identical to the true DAG for the predefined threshold value T=1.0e-6 in 99 out of the 100 trials. In the remaining trial, 2 of the 3160 edges were reversed though the problem was not due to the algorithm, but to a numerical precision in the loss evaluation.

Either parallel or non-parallel processing can be chosen. Using the non-parallel algorithm for the 20-variable case was faster, but using the parallel algorithm was faster for the 40-, 80-, and 100-variable cases.

By changing the initial topological order method to use the variance of variables method, the accuracy results were essentially identical. However, the computation time decreased dramatically from 25% to 64% across the six different cases, the first experiment and the second experiment, as shown in Table 10 below.

TABLE 10

| | Case 1 | Case 2 | Case 3 | Case 4 | Case 5 | Case 6 | Exp 1 - 1000 | Exp 2 - 10,000 |
|---|---|---|---|---|---|---|---|---|
| Random method | 1.06 ± 0.14 | 1.05 ± 0.125 | 9.817 ± 1.04 | 9.048 ± 1.05 | 47.33 ± 7.077 | 37.722 ± 7.43 | 146.21 ± 27.64 | 147.62 ± 29.4 |
| Variance method | 0.8 ± 0.26 | 0.62 ± 0.17 | 7.85 ± 1.36 | 6.38 ± 2.1 | 26.94 ± 7.01 | 13.69 ± 4.22 | 68.89 ± 15.22 | 70.87 ± 18.26 |

Relative to parallel evaluation, for the 80-variable cases, DAG learning application 122 took about 30 minutes to finish one simulation using the non-parallel algorithm on a single PC (Intel® Core™ i7-6700 CPU, 32 GB memory), but about 40 seconds using a parallel algorithm in a grid computing environment (138-machine grid using more than 5,000 CPUs). To further reduce the computation time, the topological order vectors with their associated loss value could be stored, for example, in a hash table that is searched to avoid computing the loss value again.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
  compute a sum of square and cross products (SSCP) matrix from variable values of a plurality of variables defined for a plurality of observation vectors, wherein the SSCP matrix has a dimension of $N_v \times N_v$, where $N_v$ is a number of the plurality of variables;
  initialize a topological order vector that defines a topological order for the plurality of variables;

compute an initial loss value using the initialized topological order vector and the computed SSCP matrix;
learn a directed acyclic graph by
(A) selecting a neighbor determination method;
(B) determining a next topological order vector using the selected neighbor determination method;
(C) computing a loss value using the determined next topological order vector and the computed SSCP matrix;
(D) repeating (B) and (C) until each topological order vector is determined in (B) based on the selected neighbor determination method;
(E) determining a best topological order vector from each determined next topological order vector based on having a minimum value for the computed loss value; and
(F) computing an adjacency matrix using the determined best topological order vector and the computed SSCP matrix, wherein the adjacency matrix has the dimension of $N_v \times N_v$, wherein values in the computed adjacency matrix indicate whether a variable is a parent of another variable; and
(G) output the computed adjacency matrix, wherein data in the computed adjacency matrix defines the directed acyclic graph based on the plurality of observation vectors wherein the directed acyclic graph describes relationships among the plurality of variables.

2. The non-transitory computer-readable medium of claim 1, wherein the SSCP matrix is computed using $SSCP = X^{\tau} X$, where SSCP indicates the computed SSCP matrix, X is an input matrix having dimension $N \times N_v$, wherein $X = x_{i,j}$, $j=1, \ldots, N_v$; $i=1, \ldots, N$, $x_{i,j}$ is a $j^{th}$ variable value of the plurality of variables of the $i^{th}$ observation vector of the plurality of observation vectors, $\tau$ indicates a transpose, and N is a number of the plurality of observation vectors.

3. The non-transitory computer-readable medium of claim 1, wherein (B) and (C) are repeated for $i*j$ topological order vectors, where $i=1, \ldots, N_v-1$ and $j=i, \ldots, N_v$.

4. The non-transitory computer-readable medium of claim 1, wherein the topological order vector includes a unique index assigned to each variable of the plurality of variables.

5. The non-transitory computer-readable medium of claim 4, wherein the topological order vector is initialized based on an order of the unique index assigned to each variable of the plurality of variables.

6. The non-transitory computer-readable medium of claim 4, wherein the topological order vector is initialized by randomly selecting a variable of the plurality of variables that has not been added to the topological order vector and adding the unique index associated with the randomly selected variable to the topological order vector until all of the unique indices are added to the topological order vector.

7. The non-transitory computer-readable medium of claim 4, wherein the topological order vector is initialized by computing a variance value for each variable from the variable values of each respective variable of the plurality of variables and by adding the unique index associated with each variable to the topological order vector in order based on the computed variance value.

8. The non-transitory computer-readable medium of claim 7, wherein the unique index associated with each variable is added to the topological order vector in increasing order of the computed variance value.

9. The non-transitory computer-readable medium of claim 4, wherein initializing the topological order vector comprises:
initializing the topological order vector to an empty vector;
(H) identifying a variable of the plurality of variables that has no parent based on values associated with the identified variable in a predefined, initial adjacency matrix;
(I) adding the unique index associated with the identified variable of the plurality of variables to the topological order vector;
(J) removing the identified variable as a parent of remaining variables of the plurality of variables that have not been added to the topological order vector; and
repeating (H) through (J) until each variable of the plurality of variables is identified in (H).

10. The non-transitory computer-readable medium of claim 9, wherein before initializing the topological order vector, the computer-readable instructions further cause the computing device to compute the predefined, initial adjacency matrix using the plurality of observation vectors.

11. The non-transitory computer-readable medium of claim 4, wherein the topological order vector is initialized using $r_0 = \text{rank}(\tilde{p})$, where $r_0$ is the topological order vector, and $\tilde{p}$ is a predefined vector.

12. The non-transitory computer-readable medium of claim 11, wherein before initializing the topological order vector, the computer-readable instructions further cause the computing device to compute the predefined vector using the plurality of observation vectors.

13. The non-transitory computer-readable medium of claim 1, wherein after (F) and before (G), the computer-readable instructions further cause the computing device to:
compute an estimation error matrix $W^e$ based on the determined best topological order vector, wherein the estimation error matrix has the dimension of $N_v \times N_v$, wherein values in the computed estimation error matrix indicate an error value associated with each respective element of the computed adjacency matrix;
initializing a t-statistic matrix $W^t$ with zeroes, wherein the t-statistic matrix $W^t$ has the dimension of $N_v \times N_v$;
initializing a matrix $W^p$ with ones, wherein the matrix $W^p$ has the dimension of $N_v \times N_v$;
updating the t-statistic matrix $W^t$ such that when $W^e(i, j) > 0$, $W^t(i, j) = W(i, j)/W^e(i, j)$, $i=1, \ldots, N_v$, $j=1, \ldots, N_v$, where W is the computed adjacency matrix;
updating the matrix $W^p$ such that when $W^t(i, j) > 0$, $W^p(i, j) = 2(1 - \text{cdf}(\text{NORMAL}, W^t(i, j)))$, and when $W^t(i, j) < 0$, $W^p(i, j) = 2(\text{cdf}(\text{NORMAL}, W^t(i, j)))$, $i=1, \ldots, N_v$, $j=1, \ldots, N_v$, where cdf indicates a cumulative distribution function computation based on a normal distribution function NORMAL with the t-statistic matrix $W^t(i, j)$ value as the random variable; and
setting $W(i, j) = 0$, when $W^p(i, j) > T$, and $W(i, j) = 1$, when $W^p(i, j) \leq T$, $i=1, \ldots, N_v$, $j=1, \ldots, N_v$, where T is a predefined threshold value.

14. The non-transitory computer-readable medium of claim 13, wherein computing the estimation error matrix comprises:
initializing an index value;
permuting the computed SSCP matrix using the determined best topological order vector;
(H) sweeping the permuted SSCP matrix based on the index value to define a swept SSCP matrix;
(I) computing $W^e(j, i+1) = \sqrt{SSCP^s(i+1, i+1) * SSCP^s(j,j)/(N-i)}$, $j=1, \ldots i$, where i is the index value, $SSCP^s$ is the defined, swept SSCP matrix, and N is a number of the plurality of observation vectors;
(J) incrementing the index value;
repeating (H) through (J) until $i > (N_v - 1)$; and
permuting the computed estimation error matrix using the determined best topological order vector.

15. The non-transitory computer-readable medium of claim 14, wherein the computed SSCP matrix is permuted using $SSCP^p = P^{\tau}(r_b) \cdot SSCP \cdot P(r_b)$, where SSCP indicates the computed SSCP matrix, $r_b$ indicates the determined best topological order vector, P indicates a permutation matrix, and τ indicates a transpose, wherein the permutation matrix is defined using P(k, l)=1, when $r_b(k)$=l,k=1, . . . , $N_v$, l=1, . . . , $N_v$; else P(k, l)=0.

16. The non-transitory computer-readable medium of claim 14, wherein the computed estimation error matrix is permuted using $W^e = P(r_b) \cdot W^e \cdot P^\tau(r_b)$, where $r_b$ indicates the determined best topological order vector, P indicates a permutation matrix, and τ indicates a transpose, wherein the permutation matrix is defined using P(k, l)=1, when $r_b(k)$=l, k=1, . . . , $N_v$, l=1, . . . , $N_v$; else P(k, l)=0.

17. The non-transitory computer-readable medium of claim 1, wherein computing the adjacency matrix comprises:
　initializing an index value to one;
　permuting the computed SSCP matrix using the determined best topological order vector;
　(H) sweeping the permuted SSCP matrix based on the index value to define a swept SSCP matrix;
　(I) computing W(j, i+1)=$SSCP^s$(j, i+1), j=1, . . . i, where W is the computed adjacency matrix, i is the index value, and $SSCP^s$ is the defined, swept SSCP matrix;
　(J) incrementing the index value by one;
　repeating (H) through (J) until i>($N_v$-1); and
　permuting the computed adjacency matrix using the determined best topological order vector.

18. The non-transitory computer-readable medium of claim 17, wherein the computed SSCP matrix is permuted using $SSCP^p = P^\tau(r_b) \cdot SSCP \cdot P(r_b)$, where SSCP indicates the computed SSCP matrix, $r_b$ indicates the determined best topological order vector, P indicates a permutation matrix, and τ indicates a transpose, wherein the permutation matrix is defined using P(k, l)=1, when $r_b$(k)=l, k=1, . . . , $N_v$, l=1, . . . , $N_v$; else P(k, l)=0.

19. The non-transitory computer-readable medium of claim 17, wherein the computed adjacency matrix is permuted using $W = P(r_b) \cdot W \cdot P^\tau(r_b)$, where $r_b$ indicates the determined best topological order vector, P indicates a permutation matrix, and τ indicates a transpose, wherein the permutation matrix is defined using P(k, l)=1, when $r_b$(k)=l, k=1, . . . , $N_v$, l=1, . . . , $N_v$; else P(k, l)=0.

20. The non-transitory computer-readable medium of claim 1, wherein computing the loss value in (C) comprises:
　initializing an index value to one;
　permuting the computed SSCP matrix using the determined next topological order vector;
　(H) adding $SSCP^p$(i, i) to the loss value, where $SSCP^p$ is the permuted SSCP matrix, and i is the index value;
　(I) sweeping the permuted SSCP matrix based on the index value to redefine $SSCP^p$;
　(J) incrementing the index value by one;
　repeating (H) through (J) until i>($N_v$-1); and
　adding $SSCP^p$($N_v$, $N_v$) to the loss value.

21. The non-transitory computer-readable medium of claim 20, wherein the computed SSCP matrix is permuted using $SSCP^p = P^\tau(r) \cdot SSCP \cdot P(r)$, where SSCP indicates the computed SSCP matrix, r indicates the determined next topological vector, P indicates a permutation matrix, and τ indicates a transpose, wherein the permutation matrix is defined using P(k, l)=1, when r(k)=l,k=1, . . . , $N_v$, l=1, . . . , $N_v$; else P (k, l)=0.

22. The non-transitory computer-readable medium of claim 1, wherein the SSCP matrix is computed using SSCP=$D^\tau$D, where SSCP indicates the computed SSCP matrix, D is a matrix having dimension N×(K+1)$N_v$, τ indicates a transpose, and N is a number of the plurality of observation vectors, wherein D is defined from the plurality of observation vectors, and a plurality of orthogonal vectors computed for each orthogonal basis function of a plurality of predefined orthogonal basis functions, where K is a number of the plurality of predefined orthogonal basis functions.

23. The non-transitory computer-readable medium of claim 22, wherein the plurality of observation vectors is distributed across a plurality of computing devices, wherein the SSCP matrix is computed by each computing device of the plurality of computing devices on a subset of the plurality of observation vectors distributed to a respective computing device.

24. The non-transitory computer-readable medium of claim 1, wherein computing the loss value in (C) comprises:
　initializing a first index value to one;
　permuting the computed SSCP matrix using the determined next topological order vector;
　(H) adding $SSCP^p$((i−1)*(K+1)+1, (i−1)*(K+1)+1) to the loss value, where $SSCP^p$ is the permuted SSCP matrix, i is the first index value, and K is a number of a plurality of predefined orthogonal basis functions;
　(I) initializing a second index value to (i−1)*(K+1)+2;
　(J) sweeping the permuted SSCP matrix based on the second index value to redefine $SSCP^p$;
　(K) incrementing the second index value by one;
　(L) repeating (J) through (K) until j>(i−1)*(K+1)+(K+1), where j is the second index value;
　(M) incrementing the first index value by one;
　repeating (H) through (M) until i>($N_v$-1); and
　adding $SSCP^p$(($N_v$-1)*(K+1)+1, ($N_v$-1)*(K+1)+1) to the loss value.

25. The non-transitory computer-readable medium of claim 1, wherein determining the next topological order vector in (B) comprises:
　initializing a first index value to one;
　(H) when $r_c(k)$<i or $r_c(k)$>j, r(k)=$r_c(k)$, where r is the next topological order vector, $r_c$ is the initialized topological order vector or the next topological order vector determined for a most recent prior iteration of (B) when (B) has been performed at least once, k is the first index value, i is a predefined second index value, and j is a predefined third index value;
　(I) when $r_c(k)$=j, r(k)=i;
　(J) when i≤$r_c(k)$<j, r(k)=$r_c(k)$+1;
　(K) incrementing the first index value by one; and
　repeating (H) through (K) until k>$N_v$, wherein (B) and (C) are repeated for i*j topological order vectors, where i=1, . . . , $N_v$-1 and j=i, . . . , $N_v$.

26. The non-transitory computer-readable medium of claim 1, wherein determining the next topological order vector in (B) comprises:
　initializing a first index value to one;
　(H) when $r_c(k)$≠i and $r_c(k)$≠j, r(k)=$r_c(k)$, where r is the next topological order vector, $r_c$ is the initialized topological order vector or the next topological order vector determined for a most recent prior iteration of (B) when (B) has been performed at least once, k is the first index value, i is a predefined second index value, and j is a predefined third index value;
　(I) when $r_c(k)$=i, r(k)=j;
　(J) when $r_c(k)$=j, r(k)=i;
　(K) incrementing the first index value by one;
　repeating (H) through (K) until k>$N_v$, wherein (B) and (C) are repeated for i*j topological order vectors, where i=1, . . . , $N_v$-1 and j=i, . . . , $N_v$.

27. The non-transitory computer-readable medium of claim 1, wherein determining the next topological order vector in (B) comprises:
　initializing a first index value to one;
　(H) when $r_c(k)$<i or $r_c(k)$>j, r(k)=$r_c(k)$, where r is the next topological order vector, $r_c$ is the initialized topological order vector or the next topological order vector determined for a most recent prior iteration of (B) when (B) has been performed at least once, k is the first index value, i is a predefined second index value, and j is a predefined third index value;

(I) when $r_c(k)=i$, $r(k)=j$;

(J) when $i<r_c(k)\leq j$, $r(k)=r_c(k)-1$; and (K) incrementing the first index value by one; and repeating (H) through (K) until $k>N_v$, wherein (B) and (C) are repeated for i*j topological order vectors, where $i=1, \ldots, N_v-1$ and $j=i, \ldots, N_v$.

28. The non-transitory computer-readable medium of claim 1, wherein the neighbor determination method is selected from a plurality of neighbor determination methods, wherein (B), (C), and (D) are performed by each computing device of a plurality of computing devices using a different neighbor determination method of the plurality of neighbor determination methods.

29. A computing device comprising:

a processor; and a non-transitory computer-readable medium operably coupled to the processor, the computer-readable medium having computer-readable instructions stored thereon that, when executed by the processor, cause the computing device to compute a sum of square and cross products (SSCP) matrix from variable values of a plurality of variables defined for a plurality of observation vectors, wherein the SSCP matrix has a dimension of $N_v \times N_v$, where $N_v$ is a number of the plurality of variables;

initialize a topological order vector that defines a topological order for the plurality of variables;

compute an initial loss value using the initialized topological order vector and the computed SSCP matrix;

learn a directed acyclic graph by (A) selecting a neighbor determination method;

(B) determining a next topological order vector using the selected neighbor determination method;

(C) computing a loss value using the determined next topological order vector and the computed SSCP matrix;

(D) repeating (B) and (C) until each topological order vector is determined in (B) based on the selected neighbor determination method;

(E) determining a best topological order vector from each determined next topological order vector based on having a minimum value for the computed loss value; and (F) computing an adjacency matrix using the determined best topological order vector and the computed SSCP matrix, wherein the adjacency matrix has the dimension of $N_v \times N_v$, wherein values in the computed adjacency matrix indicate whether a variable is a parent of another variable; and (G) output the computed adjacency matrix, wherein data in the computed adjacency matrix defines the directed acyclic graph based on the plurality of observation vectors, wherein the directed acyclic graph describes relationships among the plurality of variables.

30. A method of learning a directed acyclic graph, the method comprising:

computing, by a computing device, a sum of square and cross products (SSCP) matrix from variable values of a plurality of variables defined for a plurality of observation vectors, wherein the SSCP matrix has a dimension of $N_v \times N_v$, where $N_v$ is a number of the plurality of variables;

initializing, by the computing device, a topological order vector that defines a topological order for the plurality of variables;

computing, by the computing device, an initial loss value using the initialized topological order vector and the computed SSCP matrix;

learning, by the computing device, a directed acyclic graph by (A) selecting, by the computing device, a neighbor determination method;

(B) determining, by the computing device, a next topological order vector using the selected neighbor determination method;

(C) computing, by the computing device, a loss value using the determined next topological order vector and the computed SSCP matrix;

(D) repeating, by the computing device, (B) and (C) until each topological order vector is determined in (B) based on the selected neighbor determination method;

(E) determining, by the computing device, a best topological order vector from each determined next topological order vector based on having a minimum value for the computed loss value; and (F) computing, by the computing device, an adjacency matrix using the determined best topological order vector and the computed SSCP matrix, wherein the adjacency matrix has the dimension of $N_v \times N_v$, wherein values in the computed adjacency matrix indicate whether a variable is a parent of another variable; and (G) outputting, by the computing device, the computed adjacency matrix, wherein data in the computed adjacency matrix defines the directed acyclic graph based on the plurality of observation vectors, wherein the directed acyclic graph describes relationships among the plurality of variables.

* * * * *

UNITED STATES PATENT AND TRADEMARK OFFICE
CERTIFICATE OF CORRECTION

PATENT NO. : 11,443,198 B1　　　　　　　　　　　　　　　　　　　　　　Page 1 of 3
APPLICATION NO. : 17/522062
DATED : September 13, 2022
INVENTOR(S) : Xilong Chen et al.

It is certified that error appears in the above-identified patent and that said Letters Patent is hereby corrected as shown below:

In the Specification

Column 10, Line 22:
Delete the phrase "$SSCP = X^\tau X$," and replace with --$SSCP = X^\mathrm{T} X$,--.

Column 10, Line 25:
Delete the phrase "$\tau$" and replace with --T--.

Column 11, Line 67:
Delete the phrase "$SSCP^{r_0} = P^\tau(r_0) \cdot SSCP \cdot P(r_0)$" and replace with
--$SSCP^{r_0} = P^\mathrm{T}(r_0) \cdot SSCP \cdot P(r_0)$--.

Column 13, Line 1:
Delete the phrase "$SSCP^r = P^\tau(r) \cdot SSCP \cdot P(r)$" and replace with --$SSCP^r = P^\mathrm{T}(r) \cdot SSCP \cdot P(r)$--.

Column 14, Line 17:
Delete the phrase "$SSCP^{r_b} = P^\tau(r_b) \cdot SSCP \cdot P(r_b)$." and replace with
--$SSCP^{r_b} = P^\mathrm{T}(r_b) \cdot SSCP \cdot P(r_b)$--.

Column 14, Line 39:
Delete the phrase "$\widetilde{W} = P(r_b) \cdot \widetilde{W} \cdot P^\tau(r_b)$." and replace with --$\widetilde{W} = P(r_b) \cdot \widetilde{W} \cdot P^\mathrm{T}(r_b)$--.

Column 14, Line 41:
Delete the phrase "$W^e = P(r_b) \cdot W^e \cdot P^\tau(r_b)$." and replace with --$W^e = P(r_b) \cdot W^e \cdot P^\mathrm{T}(r_b)$.--.

Column 16, Line 5:
Delete the phrase "$SSCP = D^\tau D$," and replace with --$SSCP = D^\mathrm{T} D$,--.

Signed and Sealed this
　　　　　　　　　　　　　　　　　　Thirty-first Day of January, 2023

*Katherine Kelly Vidal*

Katherine Kelly Vidal
　　　　　　　　　　　　　*Director of the United States Patent and Trademark Office*

CERTIFICATE OF CORRECTION (continued)
U.S. Pat. No. 11,443,198 B1

Column 16, Line 21:
Delete the phrase "$P_{BLOCK}{}^{\tau}(r_0)$." and replace with --$P_{BLOCK}^{T}(r_0)$.--.

In the Claims

Claim 1, Column 21, Line 24:
Delete the phrase "vectors wherein" and replace with --vectors, wherein--.

Claim 2, Column 21, Line 27:
Delete the phrase "$SSCP = X^{\tau}X$," and replace with --$SSCP = X^{T}X$,--.

Claim 2, Column 21, Line 32:
Delete the phrase "$\tau$" and replace with --T--.

Claim 14, Column 22, Line 54:
Delete the phrase "computing   $W^{e}(j,\ \ i + 1) =$" and replace with --computing $W^{e}(j, i + 1) =$--.

Claim 15, Column 22, Line 65:
Delete the phrase "$SSCP^{p} = P^{\tau}(r_b) \cdot SSCP \cdot P(r_b)$," and replace with
--$SSCP^{p} = P^{T}(r_b) \cdot SSCP \cdot P(r_b)$,--.

Claim 15, Column 23, Line 1:
Delete the phrase "$\tau$" and replace with --T--.

Claim 16, Column 23, Line 6:
Delete the phrase "$W^{e} = P(r_b) \cdot W^{e} \cdot P^{\tau}(r_b)$," and replace with --$W^{e} = P(r_b) \cdot W^{e} \cdot P^{T}(r_b)$,--.

Claim 16, Column 23, Line 8:
Delete the phrase "$\tau$" and replace with --T--.

Claim 18, Column 23, Line 26:
Delete the phrase "$SSCP^{p} = P^{\tau}(r_b) \cdot SSCP \cdot P(r_b)$," and replace with
--$SSCP^{p} = P^{T}(r_b) \cdot SSCP \cdot P(r_b)$,--.

Claim 18, Column 23, Line 29:
Delete the phrase "$\tau$" and replace with --T--.

Claim 19, Column 23, Line 34:
Delete the phrase "$W = P(r_b) \cdot W \cdot P^{\tau}(r_b)$," and replace with --$W = P(r_b) \cdot W \cdot P^{T}(r_b)$,--.

Claim 19, Column 23, Line 36:
Delete the phrase "$\tau$" and replace with --T--.

Claim 21, Column 23, Line 51:
Delete the phrase "$SSCP^{p} = P^{\tau}(r) \cdot SSCP \cdot P(r)$," and replace with --$SSCP^{p} = P^{T}(r) \cdot SSCP \cdot P(r)$,--.

CERTIFICATE OF CORRECTION (continued)
U.S. Pat. No. 11,443,198 B1

<u>Claim 21, Column 23, Line 53:</u>
Delete the phrase "$\tau$" and replace with --T--.

<u>Claim 22, Column 23, Line 59:</u>
Delete the phrase "$SSCP = D^{\tau}D$," and replace with --$SSCP = D^{T}D$,--.

<u>Claim 22, Column 23, Line 60:</u>
Delete the phrase "$\tau$" and replace with --T--.